US010628114B2

(12) United States Patent
Kasahara et al.

(10) Patent No.: US 10,628,114 B2
(45) Date of Patent: Apr. 21, 2020

(54) DISPLAYING IMAGES WITH INTEGRATED INFORMATION

(71) Applicant: Sony Corporation, Tokyo (JP)

(72) Inventors: Shunichi Kasahara, Kanagawa (JP); Junichi Rekimoto, Kanagawa (JP)

(73) Assignee: Sony Corporation (JP)

( * ) Notice: Subject to any disclaimer, the term of this patent is extended or adjusted under 35 U.S.C. 154(b) by 22 days.

(21) Appl. No.: 15/761,635

(22) PCT Filed: Jul. 11, 2016

(86) PCT No.: PCT/JP2016/070477
§ 371 (c)(1),
(2) Date: Mar. 20, 2018

(87) PCT Pub. No.: WO2017/056631
PCT Pub. Date: Apr. 6, 2017

(65) Prior Publication Data
US 2018/0349083 A1    Dec. 6, 2018

(30) Foreign Application Priority Data

Sep. 30, 2015   (JP) ................................. 2015-195059

(51) Int. Cl.
*G06F 3/14*      (2006.01)
*H04N 7/18*      (2006.01)
(Continued)

(52) U.S. Cl.
CPC .......... *G06F 3/1454* (2013.01); *G06F 1/1686* (2013.01); *G06F 3/011* (2013.01);
(Continued)

(58) Field of Classification Search
CPC ...... G06F 3/1454; G06F 3/011; G06F 1/1686; G06F 3/017; H04N 7/152; H04N 7/147;
(Continued)

(56) References Cited

U.S. PATENT DOCUMENTS 6,611,242 B1    8/2003  Hongo et al.
2002/0049510 A1    4/2002  Oda et al.
(Continued)

FOREIGN PATENT DOCUMENTS

JP    2000231625 A    8/2000
JP    2002132487 A    5/2002
(Continued)

OTHER PUBLICATIONS

Kasahara, et al. "JackIn: Integrating First Person View with Out-of-Body Vision Generation for Human-Human Augmentation," AH '14 Proceedings of the 5th Augmented Human International Conference, Article No. 46, Kobe, Japan, Mar. 7-8, 2014, (Year: 2014).*
(Continued)

*Primary Examiner* — Maurice L. McDowell, Jr.
*Assistant Examiner* — Donna J. Ricks
(74) *Attorney, Agent, or Firm* — Lerner, David, Littenberg, Krumholz & Mentlik, LLP

(57) ABSTRACT

To provide an information processing system and information processing method that control display of information input with a receiver of a captured image.

In a case where a first Ghost and a second Ghost receive an image (first person view) captured by a Body and first information generated in accordance with input to the first Ghost and second information generated in accordance with input to the second Ghost are transmitted to the Body, a control unit 509 performs control such that an integrated image obtained by integrating the first information and the second information is displayed and output to a display unit 503.

18 Claims, 20 Drawing Sheets

(51) Int. Cl.
  *H04N 5/225* (2006.01)
  *H04N 7/15* (2006.01)
  *G06F 1/16* (2006.01)
  *H04N 7/14* (2006.01)
  *G06F 3/01* (2006.01)
  *G06T 11/60* (2006.01)

(52) U.S. Cl.
  CPC ............ *G06F 3/017* (2013.01); *G06T 11/60* (2013.01); *H04N 5/225* (2013.01); *H04N 7/147* (2013.01); *H04N 7/15* (2013.01); *H04N 7/152* (2013.01); *H04N 7/18* (2013.01); *H04N 7/185* (2013.01)

(58) Field of Classification Search
  CPC ............ H04N 5/225; H04N 7/18; H04N 7/15; H04N 7/185; G06T 11/60; G06T 19/006; G06T 2219/024; G06T 19/00; G06T 2200/24; G06T 19/003; G06T 2200/04
  See application file for complete search history.

(56) References Cited

U.S. PATENT DOCUMENTS

| | | | |
|---|---|---|---|
| 2004/0165076 A1 | 8/2004 | Nishimura et al. | |
| 2005/0267826 A1* | 12/2005 | Levy | B25J 9/1689 |
| | | | 705/34 |
| 2012/0299962 A1* | 11/2012 | White | G02B 27/017 |
| | | | 345/633 |
| 2013/0010052 A1 | 1/2013 | Ihara et al. | |
| 2013/0100306 A1* | 4/2013 | Bekiares | G08B 13/19689 |
| | | | 348/211.99 |
| 2014/0148738 A1 | 5/2014 | Nagasaka et al. | |

FOREIGN PATENT DOCUMENTS

| | | |
|---|---|---|
| JP | 2004222254 A | 8/2004 |
| JP | 2006186645 A | 7/2006 |
| JP | 2008154192 A | 7/2008 |
| JP | 2010015558 A | 1/2010 |
| JP | 2011217098 A | 10/2011 |
| JP | 2014104185 A | 6/2014 |
| JP | 2015135641 A | 7/2015 |

OTHER PUBLICATIONS

International Search Report corresponding to PCT/JP2016/070477, dated Sep. 13, 2016 (3 pgs.).

Goldberg, et al: "Collaborative online teleoperation with spatial dynamic voting and a human Tele-Actor", Proceedings / 2002 IEEE International Conference on Robotics and Automation : May 11-15, 2002, Washington, D.C, IEEE Service Center, Piscataway, NJ, vol. 2, May 11, 2002 (May 11, 2002), pp. 1179-1184, XP032882839, DOI: 10.1109/ROBOT.2002.1014703, ISBN: 978-0-7803-7272-6.

Extended European Search Report including Written Opinion for EP16850808.3 dated Apr. 30, 2019.

* cited by examiner

FIG. 6
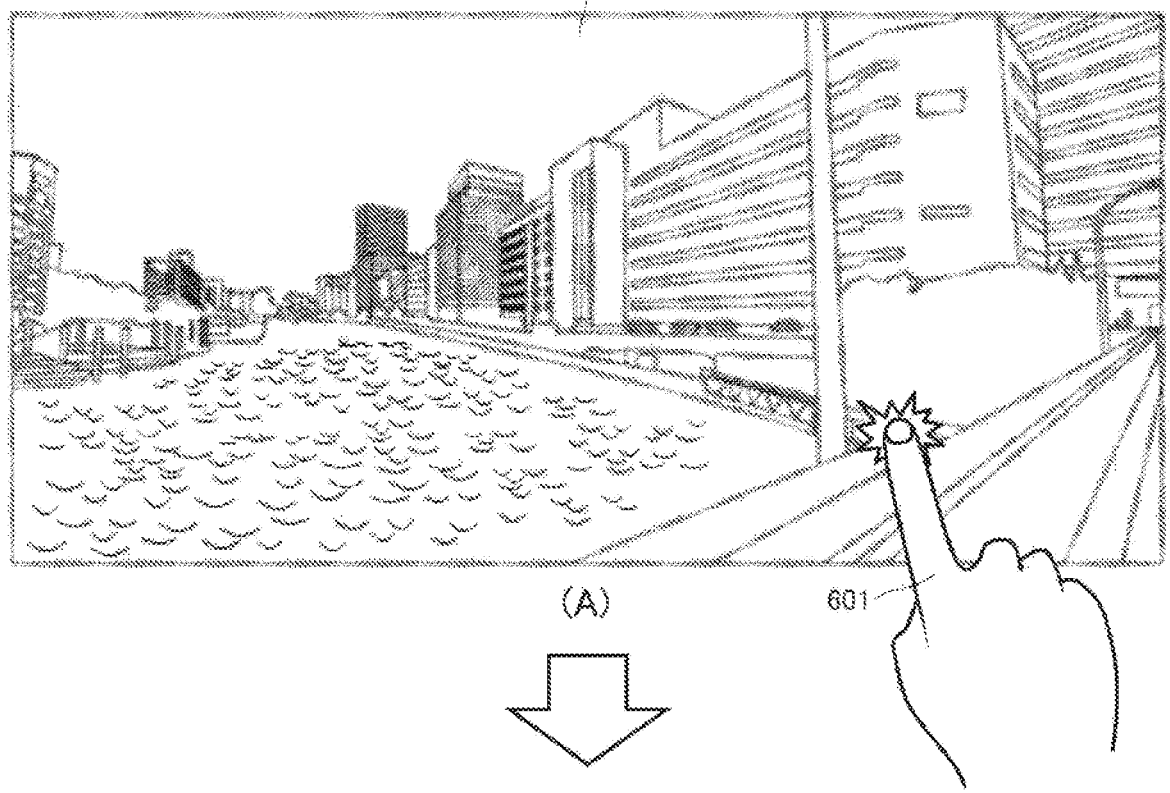
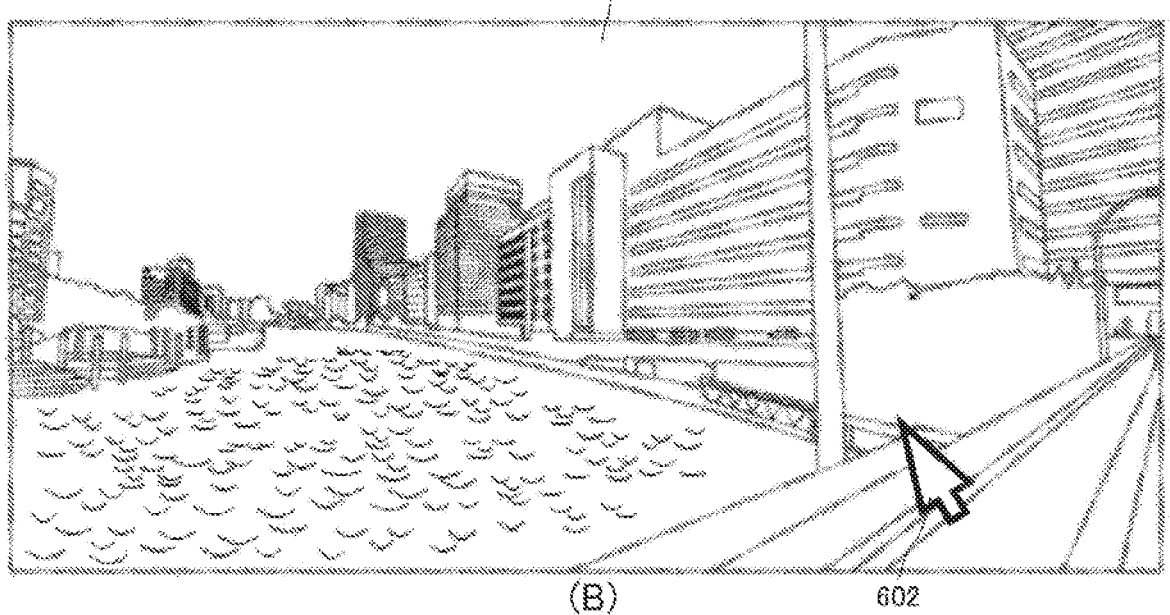

DISPLAYING IMAGES WITH INTEGRATED INFORMATION

CROSS-REFERENCE TO RELATED APPLICATIONS

This application is a national phase entry under 35 U.S.C. § 371 of International Application No. PCT/JP2016/070477 filed Jul. 11, 2016, which claims the priority from Japanese Patent Application No. 2015-195059, filed in the Japanese Patent Office on Sep. 30, 2015, the entire contents of which are hereby incorporated by reference.

TECHNICAL FIELD

A technology disclosed in the present specification relates to an information processing system and information processing method for controlling display of information input to a receiver of a captured image.

BACKGROUND ART

There is known a technology that allows a user to access a sight seen by a person/object other than the user (sight seen by a mobile body other than the user).

For example, there has been proposed a mobile camera system that remotely acquires an image captured by a mobile camera mounted on a mobile body such as a vehicle (e.g., see Patent Literature 1). Further, there has been proposed an image processing system that provides, to a person who wears a head mounted display, information similar to visual information acquired by a person who wears eyeglasses including an imaging sensing wireless device (e.g., see Patent Literature 2).

Furthermore, there has been proposed an image display system in which a display device for displaying a captured image of a mobile body specifies, with respect to an imaging device of the mobile body, a point-of-sight position and line-of-sight direction in which an image is captured and a speed at the time of capturing an image (e.g., see Patent Literature 3).

CITATION LIST

Patent Literature

Patent Literature 1: JP 2006-186645A
Patent Literature 2: JP 2004-222254A
Patent Literature 3: JP 2008-154192A
Patent Literature 4: JP 2014-104185A
Patent Literature 5: JP 2010-15558A

DISCLOSURE OF INVENTION

Technical Problem

An object of a technology disclosed in the present specification is to provide an excellent information processing system and information processing method capable of suitably controlling display of information input with a receiver of a captured image.

Solution to Problem

The technology disclosed in the present specification is devised in view of the above-described problem, a first aspect thereof is an information processing system including: a control unit configured to control display of an integrated image obtained by integrating first information generated in accordance with input to a first system that receives a captured image by an imaging system and second information generated in accordance with input to a second system that receives the captured image by the imaging system.

Note that the "system" herein refers to a logical aggregation of function modules that achieve particular functions, and the "system" is configured as a single device and is also configured as a plurality of devices that cooperatively function.

According to a second aspect of the technology disclosed in the present specification, the control unit of the information processing system according to the first aspect is configured to control display of the integrated image obtained by integrating the first information based on audio information input to the first system and the second information based on audio information input to the second system.

According to a third aspect of the technology disclosed in the present specification, the control unit of the information processing system according to the first aspect is configured to control display of the integrated image on a basis of audio information input to the first system.

According to a fourth aspect of the technology disclosed in the present specification, the control unit of the information processing system according to the third aspect is configured to cause the first information contained in the integrated image to change in accordance with a change in stress of audio input to the first system.

According to a fifth aspect of the technology disclosed in the present specification, the control unit of the information processing system according to the first aspect is configured to control display of the integrated image showing a distribution of locations indicated by a plurality of systems that include the first system and the second system and receive the captured image.

According to a sixth aspect of the technology disclosed in the present specification, the control unit of the information processing system according to the first aspect is configured to control display of the integrated image obtained by integrating the first information and the second information including text information.

According to a seventh aspect of the technology disclosed in the present specification, the control unit of the information processing system according to the first aspect is configured to extract a common word or a word that frequently appears from a plurality of pieces of text information generated by a plurality of systems that include the first system and the second system and receive the captured image and cause the word to be displayed.

According to an eighth aspect of the technology disclosed in the present specification, the control unit of the information processing system according to the seventh aspect is configured to cause the extracted words to be displayed in a form of a tag cloud.

According to a ninth aspect of the technology disclosed in the present specification, the control unit of the information processing system according to the first aspect is configured to summarize a plurality of pieces of text information generated by a plurality of systems that include the first system and the second system and receive the captured image and cause the summarized text information to be displayed.

According to a tenth aspect of the technology disclosed in the present specification, the information processing system according to the first aspect further includes: an imaging unit configured to generate the captured image.

According to an eleventh aspect of the technology disclosed in the present specification, the information processing system according to the first aspect further includes: a display unit. The control unit is then configured to control display of the integrated image by the display unit.

According to a twelfth aspect of the technology disclosed in the present specification, the display unit of the information processing system according to the eleventh aspect is configured to perform display by superimposing the integrated information on a scene of a real world.

In addition, a thirteenth aspect of the technology disclosed in the present specification is an information processing method including: a step of controlling display of an integrated image obtained by integrating first information generated in accordance with input to a first system that receives a captured image by an imaging system and second information generated in accordance with input to a second system that receives the captured image by the imaging system.

Advantageous Effects of Invention

According to the technology disclosed in the present specification, it is possible to provide an excellent information processing system and information processing method capable of suitably controlling display of information input to a receiver of a captured image.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

BRIEF DESCRIPTION OF DRAWINGS

FIG. 6 exemplifies a state in which a Ghost intervenes in vision of a Body.

MODE(S) FOR CARRYING OUT THE INVENTION

Hereinafter, an embodiment of the technology disclosed in the present specification will be described in detail with reference to the drawings.

A. System Configuration

Figure 1:
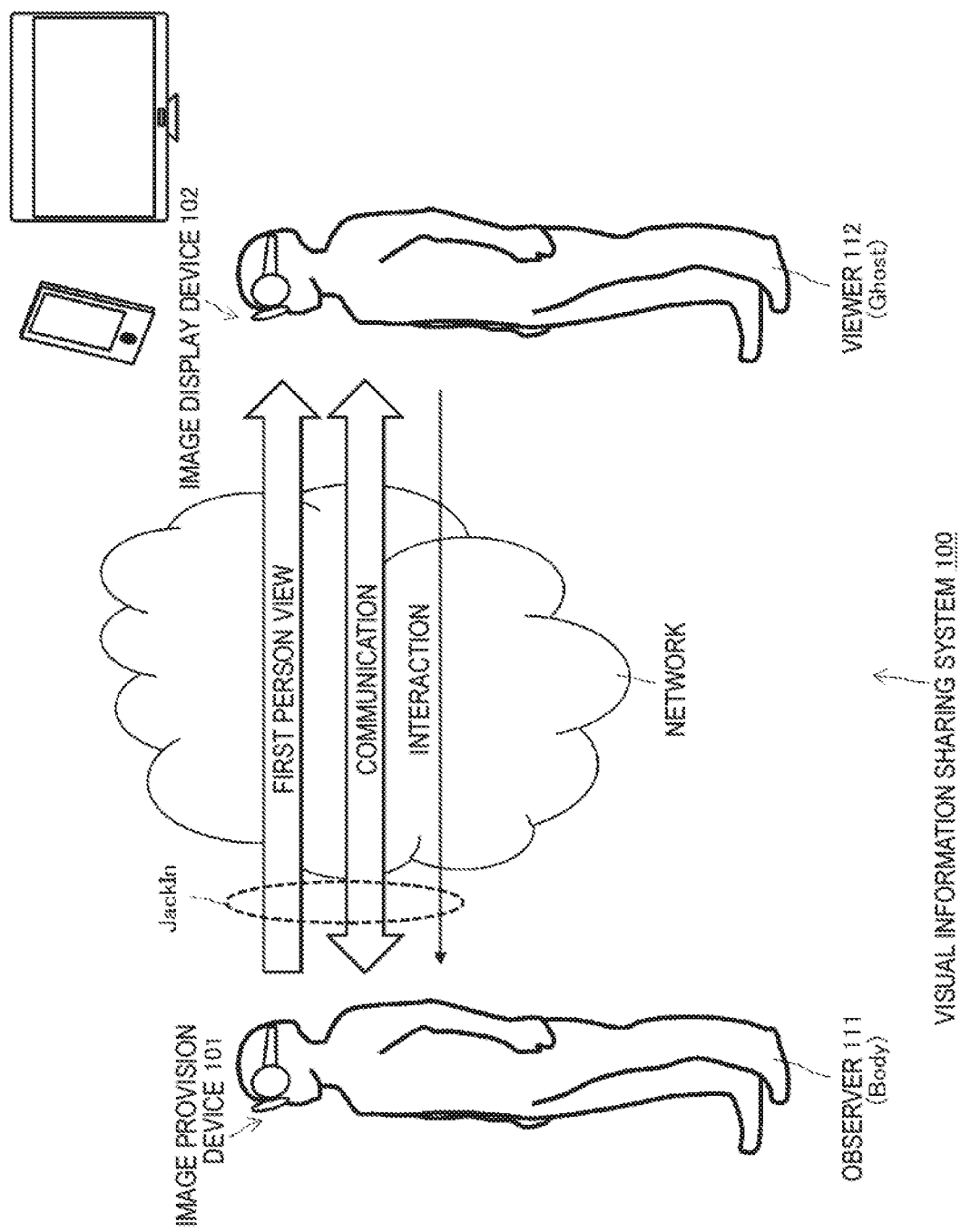
FIG. 1 illustrates an overview of a visual information sharing system 100 to which a technology disclosed in the present specification is applied.

FIG. 1 illustrates an overview of a visual information sharing system 100 to which the technology disclosed in the present specification is applied. The visual information sharing system 100 illustrated in FIG. 1 is configured by combining an image provision device 101 for providing an image obtained by capturing an image of a site and an image display device 102 for displaying the image provided from the image provision device 101.

The image provision device 101 specifically includes a camera-equipped see-through head mounted display mounted on a head part of an observer 111 who actually acts on a site. The "see-through" head mounted display herein is basically optical transmissive but may be a video see-through head mounted display. The camera provided in the head mounted display captures an image of a substantially line-of-sight direction of the observer 111 and provides a first person view (FPV) thereof.

Meanwhile, the image display device 102 is assumed to be arranged separately from the site, i.e., from the image provision device 101, and the image provision device 101 and the image display device 102 are assumed to communicate with each other via a network. The term "separately" herein includes not only a remote location but also a situation in which the image provision device 101 and the image display device 102 are slightly (e.g., approximately several meters) separate in the same room. Further, the image provision device 101 and the image display device 102 are also assumed to exchange data via a server (not illustrated).

The image display device 102 is, for example, a head mounted display worn by a person who is not on the site (viewer of captured image) 112. By using an immersive head mounted display as the image display device 102, the viewer 112 can experience the same sight as that of the observer 111 with more reality. However, a see-through head mounted display may be used as the image display device 102.

Further, the image display device 102 is not limited to a head mounted display and may be, for example, a wristwatch display. Alternatively, the image display device 102 does not need to be a wearable terminal and may be a multifunctional information terminal such as a smartphone or a tablet, a general monitor display such as a computer screen or a television receiver, a game console, a projector for projecting an image on a screen, or the like.

Because the observer 111 is actually on the site and acts with his/her body, the observer 111 who is a user of the image provision device 101 (or the image provision device 101) will also be referred to as "Body" hereinafter. Meanwhile, the viewer 112 does not act with his/her body on the site but is conscious of being on the site by viewing a first person view of the observer 111, and therefore the viewer 112 who is a user of the image display device 102 (or the image display device 102) will also be referred to as "Ghost" hereinafter.

A Body transmits the own peripheral situation to a Ghost and further shares the situation with the Ghost. One of Ghosts communicates with the Body and thus can achieve interactions such as operation support from a separate location. Immersing the Ghost in a first person experience of the Body to allow the Ghost to perform interactions in the visual information sharing system 100 will also be referred to as "JackIn" hereinafter.

The visual information sharing system 100 basically has a function of transmitting a first person view from the Body to the Ghost to allow the Ghost to view and experience the first person view and a function of allowing the Body and the Ghost to communicate with each other. By using the latter communication function, the Ghost can interact with the Body by intervention from a remote location, such as "visual intervention" that allows the Ghost to intervene in vision of the Body, "auditory intervention" that allows the Ghost to intervene in an auditory sensation of the Body, "body intervention" that allows the Ghost to move or stimulate a body of the Body or a part of the body, and "alternative conversation" that allows the Ghost to speak on a site, instead of the Body. It can also be said that JackIn has a plurality of communication channels such as "visual intervention", "auditory intervention", "body intervention", and "alternative conversation". Details of "visual intervention", "auditory intervention", "body intervention", and "alternative conversation" will be described below.

The Ghost can instruct the Body on behavior on a site through "visual intervention", "auditory intervention", "body intervention", or "alternative conversation". For example, the visual information sharing system 100 can be utilized for operation support in various industrial fields such as a medical site of a surgical operation and the like and a construction site of a construction work and the like, instructions on control of airplanes and helicopters and guidance thereof, navigation of drivers of automobiles, coaching or instructions in sports, and other uses.

For example, not only in a case where the Body desires to share the own vision with another person but also in a case where the Body desires (or needs) to be assisted, instructed, guided, and navigated by another person regarding operation that the Body currently performs through the visual intervention or the like, the Body takes the initiative in implementing JackIn with an appropriate Ghost (Body initiative start).

Further, not only in a case where the Ghost desires to view a video on a site (first person view of another person) without visiting the site but also in a case where the Ghost desires (or needs) to assist, instruct, guide, and navigate another person regarding operation that the person currently performs, the Ghost takes the initiative in implementing JackIn with a corresponding Body (Ghost initiative start).

Note that, when the Body is unlimitedly subjected to visual intervention, auditory intervention, body intervention, or conversational intervention, the own behavior may be interrupted by the Ghost, or the own behavior may be hindered and is therefore dangerous, and, in some cases, the Body's privacy is invaded. Meanwhile, the Ghost may also have some videos that the Ghost does not desire to view, or, in some cases, cannot provide services such as appropriate assistance, instruction, guidance, and navigation to the Body even in a case where the Ghost is asked to. Therefore, JackIn to the Body by the Ghost and intervention in the Body by the Ghost in a JackIn state may be limited at a certain level.

Figure 2:
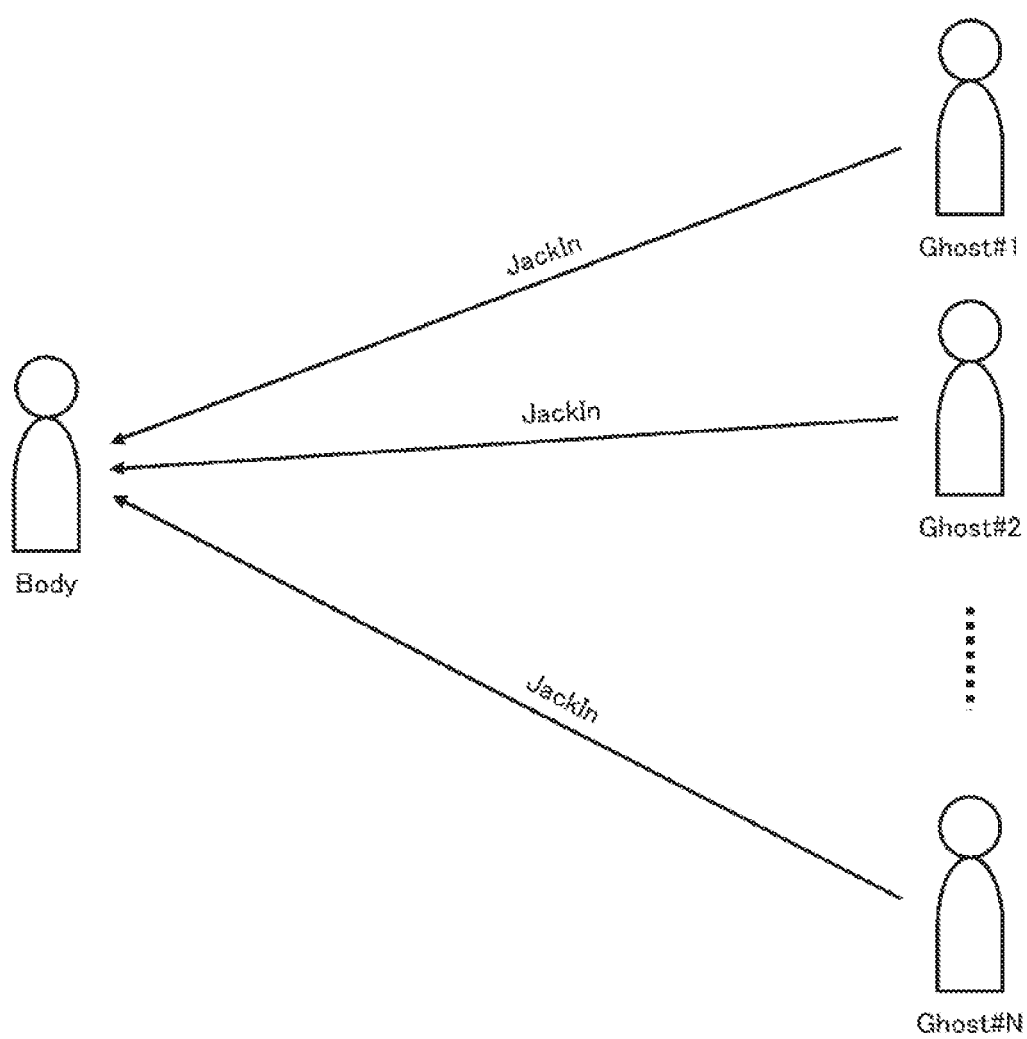
FIG. 2 schematically illustrates a network topology of 1 to N.
Figure 3:
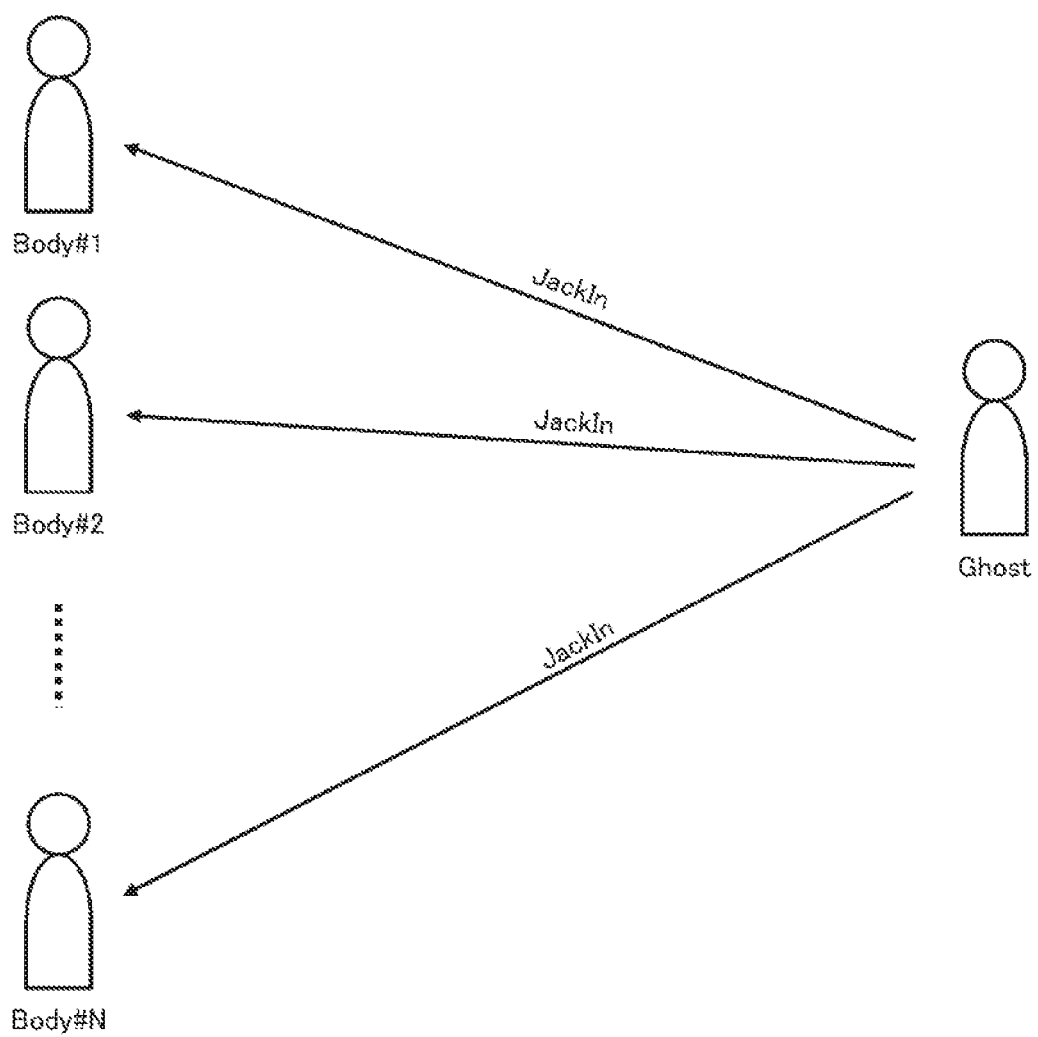
FIG. 3 schematically illustrates a network topology of N to 1.
Figure 4:
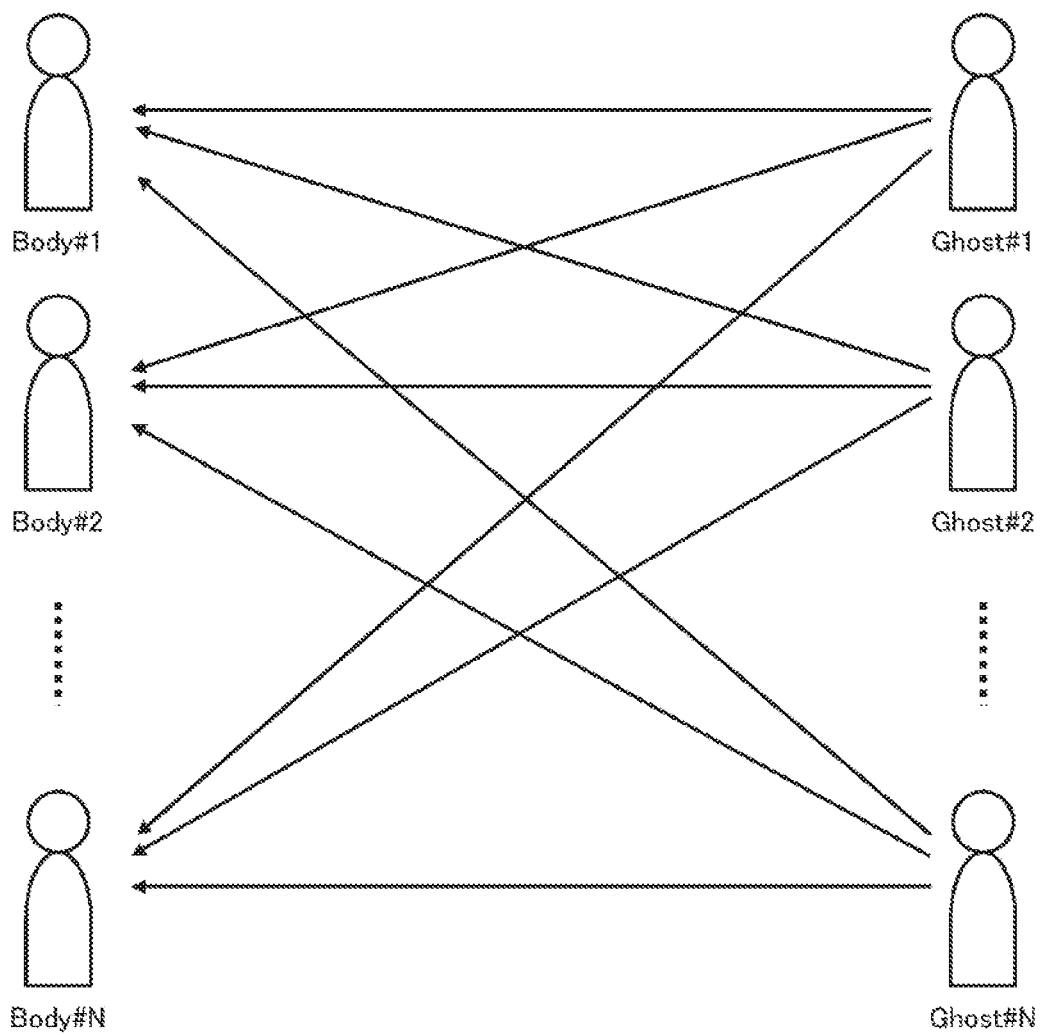
FIG. 4 schematically illustrates a network topology of N to N.

Note that, for simplification, FIG. 1 illustrates a network topology of a single Body to a single Ghost, i.e., in which only a single image provision device 101 and a single image display device 102 exist. The following are also assumed: a network topology of 1 to N in which a single Body and a plurality (N) of Ghosts simultaneously perform JackIn as illustrated in FIG. 2; a network topology of N to 1 in which a plurality (N) of Bodies and a single Ghost simultaneously perform JackIn as illustrated in FIG. 3; and a network topology of N to N in which a plurality (N) of Bodies and a plurality (N) of Ghosts simultaneously perform JackIn as illustrated in FIG. 4.

Further, switching a single device from a Body to a Ghost, switching a single device from a Ghost to a Body, and simultaneously having a role of a Body and a role of a Ghost are also assumed. There is also assumed a network topology (not illustrated) in which a single device performs JackIn to a Body as a Ghost and, at the same time, functions as a Body for another Ghost, i.e., three or more devices are daisy-chain connected. In any network topology, a server (not illustrated) may be interposed between a Body and a Ghost.

B. Functional Configuration

Figure 5:
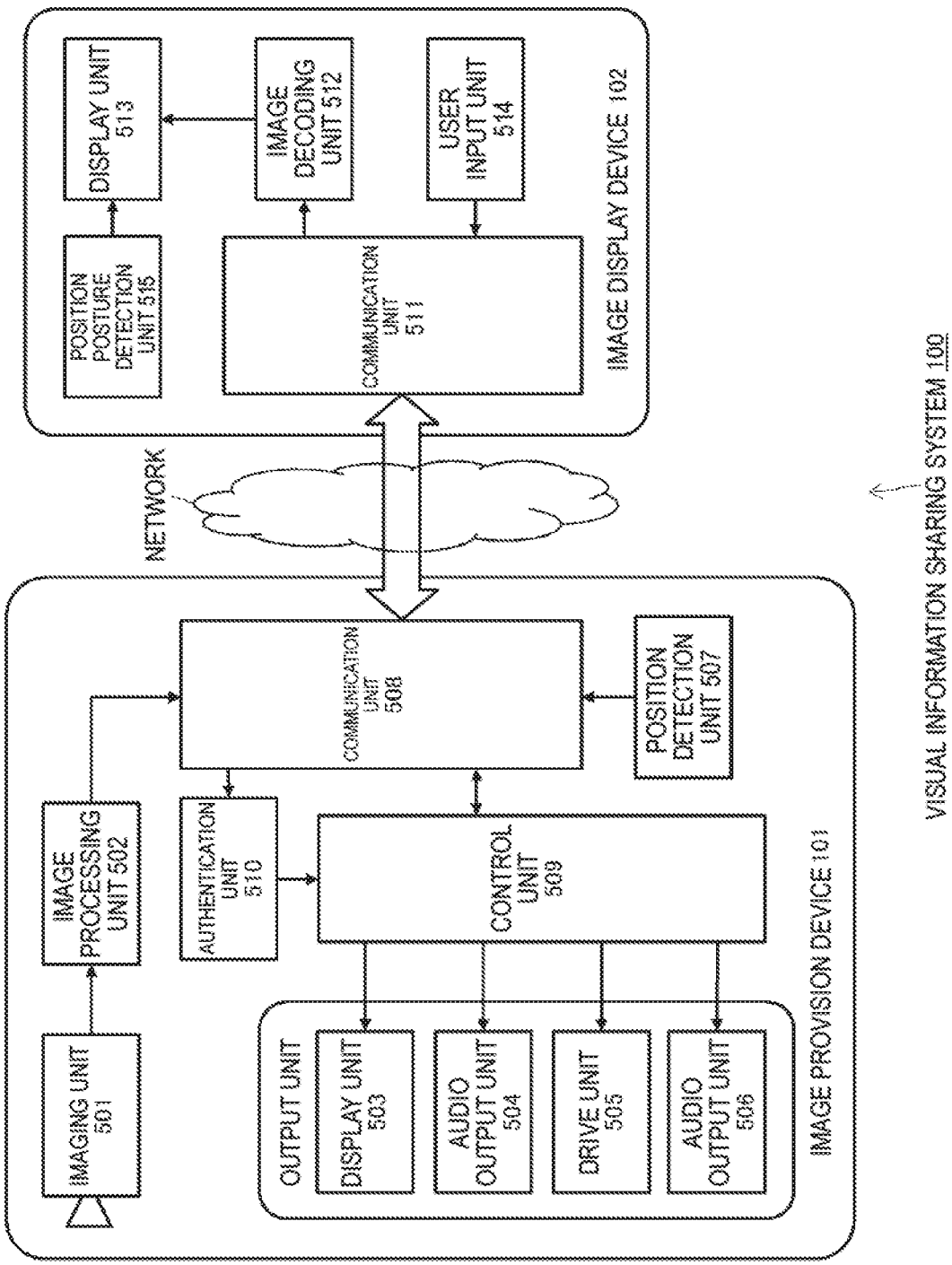
FIG. 5 illustrates a functional configuration example of an image provision device 101 and an image display device 102.

FIG. 5 illustrates a functional configuration example of the image provision device 101 and the image display device 102.

The image provision device 101 is a device to be used by a user (observer 112) who takes a role as a Body. In the example illustrated in FIG. 5, the image provision device 101 includes an imaging unit 501, an image processing unit 502, a display unit 503, a first audio output unit 504, a drive unit 505, and a second audio output unit 506 serving as an output unit, a position detection unit 507, a communication unit 508, a control unit 509, and an authentication unit 510.

The imaging unit 501 includes a camera for capturing an image of a first person view of the Body. The imaging unit 501 is attached to the head part of the observer 111 so as to capture an image of, for example, a line-of-sight direction of the Body, i.e., the observer 111. Alternatively, a whole-sky camera may be used as the imaging unit 501 to provide a 360-degree whole-sky image of an environment around the Body. However, the whole-sky image does not necessarily need to be a 360-degree image, and a field of view may be narrower. Further, the whole-sky image may be a half celestial sphere image that does not include a floor surface containing little information (The same applies hereinafter.).

The image processing unit 502 processes image signals output from the imaging unit 501. In a case where the image of the first person view of the Body captured by the imaging unit 501 is streamed as it is, the Ghost views a video that shakes strongly because the Body looks out over a surrounding environment on his/her own and changes a line-of-sight direction. Thus, health hazards such as virtual reality (VR)

sickness and motion sickness are a matter of concern. Further, the Ghost may desire to view a part on which the Body does not focus. In view of this, the image processing unit 502 simulatively forms a surrounding space on the basis of continuous images of the first person view of the Body captured by the imaging unit 501. Specifically, the image processing unit 502 performs space recognition based on simultaneous localization and mapping (SLAM) recognition technology or the like in real time with respect to a video (whole-sky image) captured by the imaging unit 501 and spatially joins a current video frame and a past video frame together, thereby rendering a video seen from a viewpoint of a virtual camera controlled by the Ghost. The video rendered at the viewpoint of the virtual camera is a video seen from a viewpoint that is simulatively out of a body of the Body rather than the first person view of the Body. Therefore, the Ghost can observe an environment around the Body independently from motion of the Body. This makes it possible to stabilize shaking of the video to prevent VR sickness and view a part on which the Body does not focus.

The display unit 503 displays and outputs information transmitted from the image display device 102, thereby allowing the Ghost to intervene in vision of the Body. In a case where the image provision device 101 is a see-through head mounted display as described above, the display unit 503 superimposes and displays an augmented reality (AR) image that expresses consciousness of the Ghost who shares a first person experience with the Body on vision of the observer 111 (i.e., scene of a real world). The AR image includes images such as a pointer, an annotation, or the like showing a location indicated by the Ghost. Therefore, the Ghost can communicate with the Body to intervene in the vision thereof, thereby interacting with the Body on a site.

The first audio output unit 504 includes, for example, earphones, headphones, or the like and causes the Body to listen to information transmitted from the image display device 102, thereby allowing the Ghost to intervene in an auditory sensation of the Body. The image display device 102 transmits information regarding consciousness of the Ghost who shares a first person experience with the Body. The image provision device 101 converts received information into audio signals and outputs audio from the first audio output unit 504, thereby causing the Body, i.e., the observer 111 to listen to the audio. Alternatively, audio signals uttered by the Ghost who currently has a first person experience are transmitted from the image display device 102 as they are. The image provision device 101 outputs the received audio signals in the form of audio from the first audio output unit 504 as they are, thereby causing the Body, i.e., the observer 111 to listen to the audio. Further, volume, quality, an output timing, and the like of audio output from the first audio output unit 504 may be appropriately adjusted. Alternatively, image information or text information transmitted from the image display device 102 may be converted into audio signals and be output in the form of audio from the first audio output unit 504. Therefore, the Ghost can communicate with the Body to intervene in the auditory sensation thereof, thereby interacting with the Body on a site.

The drive unit 505 moves or stimulates the body of the Body or a part of the body, thereby allowing the Ghost to intervene in the body of the Body. The drive unit 505 includes, for example, an actuator for applying tactile sensations or electrical stimulation (which is slight and thus does not harm health) to the body of the observer 111. Alternatively, the drive unit 505 includes a device (e.g., see Patent Literature 5) for supporting or restricting motion of the body by driving a powered suit or exoskeleton worn on arms, hands, legs, or the like of the observer 111. Therefore, the Ghost can communicate with the Body to intervene in the body thereof, thereby interacting with the Body on a site.

The second audio output unit 506 includes, for example, a wearable speaker or the like worn by the Body and outputs information or audio signals transmitted from the image display device 102 to the outside in the form of audio. The audio output from the second audio output unit 506 is heard on a site as if the Body himself/herself spoke. Therefore, the Ghost can have a conversation with people on a site where the Body exists or can give an instruction with audio, instead of the Body (alternative conversation).

The position detection unit 507 detects current position information of the image provision device 101 (i.e., Body) by using, for example, global positioning system (GPS) signals. The detected position information is used in a case where, for example, the Ghost searches for a Body who exists in a location desired by the Ghost.

The communication unit 508, which is mutually connected to the image display device 102 via a network, transmits an image of a first person view captured by the imaging unit 501 and space information and communicates with the image display device 102. Communication means of the communication unit 508 may be wireless or wired communication means and is not limited to a particular communication standard.

The authentication unit 510 performs authentication processing of the image display device 102 (or the Ghost who is a user thereof) which is mutually connected via a network and determines an output unit for outputting information transmitted from the image display device 102. Then, the control unit 509 controls output operation from the output unit on the basis of a result of authentication by the authentication unit 510. The control unit 509 has, for example, functions corresponding to a central processing unit (CPU) and a graphic processing unit (GPU).

For example, in a case where the image display device 102 is permitted to perform only visual intervention as a result of the authentication processing, the control unit 509 executes only display output from the display unit 503. Further, in a case where the image display device 102 is permitted to perform not only visual intervention but also auditory intervention, the control unit 509 executes both display output from the display unit 503 and audio output from the first audio output unit 504. A range in which the Body permits intervention by the Ghost is defined as a permission level. Meanwhile, a range in which the Ghost intervenes in the Body is defined as a mission level (described below). Note that it is also possible to form the visual information sharing system 100 so that the above processing performed by the authentication unit 510 and the control unit 509 is executed by the server (not illustrated) interposed between the image provision device 101 and the image display device 102, instead of the image provision device 101.

Meanwhile, the image display device 102 is a device to be used by a user (viewer 112) who takes a role as a Ghost. In the example illustrated in FIG. 5, the image display device 102 includes a communication unit 511, an image decoding unit 512, a display unit 513, a user input unit 514, and a position posture detection unit 515.

The communication unit 511, which is mutually connected to the image provision device 101 via a network, receives a first person view from the image provision device 101 and communicates with the image provision device 101. Communication means of the communication unit 511 may be wireless or wired communication means and is not limited to a particular communication standard. However, the communication means is compatible with the communication unit 508 of the image provision device 101.

The image decoding unit 512 performs decoding processing of image signals that the communication unit 511 receives from the image provision device 101. The display unit 513 displays and outputs the whole-sky image (first person view of the Body) which has been decoded in the image decoding unit 512. Note that the processing for rendering a video seen from a viewpoint out of the body of the Body (described above) from the first person view of the Body may be performed by the image decoding unit 512, instead of the image processing unit 502 of the image provision device 101.

The position posture detection unit 515 detects a position and posture of a head part of the viewer 112. The detected position and posture correspond to a current viewpoint position and line-of-sight direction of the Ghost. A viewpoint position and line-of-sight direction of the virtual camera (described above) to create a video seen from a viewpoint simulatively out of the body of the Body on the basis of the first person view of the Body can be controlled on the basis of the position and posture of the head part of the viewer 112 detected by the position posture detection unit 515.

The display unit 513 includes, for example, a head mounted display worn by the viewer 112 serving as a Ghost. By using an immersive head mounted display as the display unit 513, the viewer 112 can experience the same sight as that of the observer 111 with more reality. A video viewed by the viewer 112, i.e., the Ghost is not the first person view of the Body itself but is a surrounding space simulatively formed on the basis of continuous images of the first person view (video seen from a viewpoint simulatively out of the body of the Body) (described above). Further, it is possible to perform control so that the virtual camera performs head tracking of the Ghost, i.e., follows the viewpoint position and line-of-sight direction of the viewer 112 detected by the position posture detection unit 515, thereby moving an angle of view of display on the display unit 513.

The display unit 513 may be a wearable terminal such as a see-through head mounted display or a wrist-watch display, instead of an immersive head mounted display. Alternatively, the display unit 513 does not need to be a wearable terminal and may be a multifunctional information terminal such as a smartphone or a tablet, a general monitor display such as a computer screen or a television receiver, a game console, a projector for projecting an image on a screen, or the like.

The user input unit 514 is a device for allowing the viewer 112 serving as a Ghost to input the Ghost's own intention or consciousness in response to observation of the first person view of the Body displayed on the display unit 513.

The user input unit 514 includes, for example, a coordinate input device such as a touchscreen, a mouse, or a joystick. By touching, click operation of the mouse, or the like, the Ghost can directly indicate a location in which the Ghost is particularly interested on a screen that displays the first person view of the Body. The Ghost gives an indication on a pixel coordinate of a video that the Ghost currently views. However, a captured video of the Body always changes, and therefore an indication on the pixel coordinate is meaningless. In view of this, the user input unit 514 specifies, by image analysis or the like, position information on a three-dimensional space corresponding to a pixel position that the Ghost indicates by touching, click operation, or the like on the screen and transmits the position information in the three-dimensional space to the image provision device 101. Therefore, the Ghost can perform pointing that achieves fixation in a space, instead of on the pixel coordinate.

Further, the user input unit 514 may capture eye movement by using an image of a face of the Ghost captured by a camera or an eye potential, calculate a location at which the Ghost gazes, and transmit information specifying the location to the image provision device 101. Also at that time, the user input unit 514 specifies, by image analysis or the like, position information in the three-dimensional space corresponding to a pixel position at which the Ghost gazes, and transmits the position information in the three-dimensional space to the image provision device 101. Therefore, the Ghost can perform pointing that achieves fixation in a space, instead of on the pixel coordinate.

Further, the user input unit 514 includes a text input device such as a keyboard. When the Ghost has the same first person experience as that of the Body, the Ghost can input an intention that the Ghost desires to inform the Body, a consciousness that the Ghost has, and the like as text information. The user input unit 514 may transmit the text information input by the Ghost as it is to the image provision device 101 or may convert the text information into other forms of signals such as audio signals and then transmit the signals to the image provision device 101.

Further, the user input unit 514 includes an audio input device such as a microphone and inputs audio uttered by the Ghost. The user input unit 514 may transmit the input audio as they are in the form of audio signals from the communication unit 511 to the image provision device 101. Alternatively, the user input unit 514 may perform audio recognition of the input audio, convert the input audio into text information, and transmit the text information to the image provision device 101.

The Ghost is assumed to indicate an object by using a demonstrative pronoun such as "that" or "this" while viewing the first person view of the Body. In such a case, the user input unit 514 specifies, by language analysis, image analysis, or the like, position information of the object indicated by the demonstrative pronoun in the three-dimensional space and transmits the position information in the three-dimensional space to the image provision device 101. Therefore, the Ghost can perform pointing that achieves fixation in a space, instead of on the pixel coordinate.

Further, the user input unit 514 may be a gesture input device for inputting body gestures and manual gestures of the Ghost. Means for capturing gestures is not particularly limited. For example, the user input unit 514 may include a camera for capturing an image of movement of arms and legs of the Ghost and an image recognition device for processing the captured image. Further, in order to easily perform image recognition, a marker may be attached to the body of the Ghost. The user input unit 514 may transmit an input gesture from a communication unit 411 to the image provision device 101 as, for example, control signals to intervene in the body of the Body. Further, the user input unit 514 may convert the input gesture into image information to intervene in the vision of the Body (coordinate information, AR image to be superimposed and displayed, text information, or the like) or audio signals to intervene in the auditory sensation of the Body and transmit the image information or audio signals from the communication unit 511 to the image provision device 101. Further, the user input unit 514 specifies, by image analysis or the like, position information in the three-dimensional space corresponding to a pixel position indicated by a gesture of the Ghost and transmits the position information in the three-dimensional space to the image provision device 101. Therefore, the Ghost can perform pointing that achieves fixation in a space, instead of on the pixel coordinate.

A service called JackIn developed in the visual information sharing system 100 resembles a general AR technology in view of superimposing and displaying an AR image. However, it is considered that JackIn is different from a normal AR technology performed by a computer in that a human being (Ghost) augments another human being (Body).

Further, JackIn also resembles telepresence (described above). However, normal telepresence and JackIn are different in that normal telepresence is an interface for viewing the world from a viewpoint of a machine such as a robot, whereas, in JackIn, a human being (Ghost) views the world from a viewpoint of another human being (Body). Further, telepresence presupposes that a human being is a master and a machine is a slave and the machine that is the slave truly reproduces motion of the human being. Meanwhile, in a case where a human being (Ghost) performs JackIn to another human being (Body), the Body does not necessarily move in compliance with the Ghost, i.e., is an independent interface.

In the above visual information sharing system 100, a video provided from the image provision device 101 to the image display device 102 is not limited to a real-time video observed by the Body on a site (i.e., a live video captured by the imaging unit 501) and may be a past recorded video. For example, the image provision device 101 includes a mass storage device (not illustrated) for recording a past video, and the past video may be distributed from the image provision device 101. Alternatively, the past video recorded by the image provision device 101 may be accumulated in a JackIn server (provisional name) for controlling JackIn between the Body and the Ghost or another recording server, and the past video may be streamed from the server to the Ghost (image display device 102). Note that, in a case where the Ghost views the past video, no intervention in the Body including visual intervention and auditory intervention is permitted. This is because the video viewed by the Ghost is not a video of a site where the Body currently operates and intervention based on the past video hinders current operation of the Body.

Note that, regarding details of sharing vision between two devices, see also, for example, Patent Application No. 2013-78893, specification, which has already been transferred to the present applicant. Further, regarding details of visual intervention (display of AR image) in the same system 100, see also, for example, Patent Application No. 2013-78892, specification, Patent Application No. 2013-78894, specification, and Patent Application No. 2013-191464, specification, which have already been transferred to the present applicant.

C. Visual Intervention in Body by Ghost

As described above, JackIn have a plurality of communication channels such as "visual intervention", "auditory intervention", "body intervention", and "alternative conversation". Therefore, by starting JackIn with the Ghost, the Body can share the own vision with the Ghost and can be assisted, instructed, guided, and navigated by the Ghost regarding operation that is currently performed through visual intervention or the like. Further, by starting JackIn with the Body, the Ghost can have a first person experience of the Body without visiting a site and can assist, instruct, guide, and navigate the Body regarding operation thereof through visual intervention or the like. Hereinafter, interactions between the Body and the Ghost will be described particularly in terms of visual intervention.

When the Ghost indicates a certain location in a displayed image via the user input unit 514 including a coordinate input device such as a touchscreen, a mouse, or a joystick, the image display device 102 transmits information specifying the location to the image provision device 101. Then, in the image provision device 101, the display unit 503 performs display by superimposing an AR image such as a pointer showing the location indicated by the Ghost on the vision of the Body. FIG. 6(A) exemplifies an image displayed on the display unit 513 (first person image of the Body experienced by the Ghost). As denoted by a reference sign 601, the Ghost indicates a certain location in this image by touching. FIG. 6(B) exemplifies the vision of the Body at this time. As denoted by a reference sign 602, the display unit 503 of the image provision device 101 performs display so that an AR image showing the location indicated by the Ghost is superimposed on the vision of the Body.

Further, also when the Ghost indicates a certain location in a displayed image with audio or a gesture, information specifying the location is transmitted to the image provision device 101, and the image provision device 101 displays and superimposes an AR image showing the location, as in the example illustrated in FIG. 6. Alternatively, eye movement of the Ghost may be, for example, captured to detect a line-of-sight direction, and a location at which the Ghost gazes may be calculated, and therefore information specifying the location may be transmitted to the image provision device 101.

Figure 7:
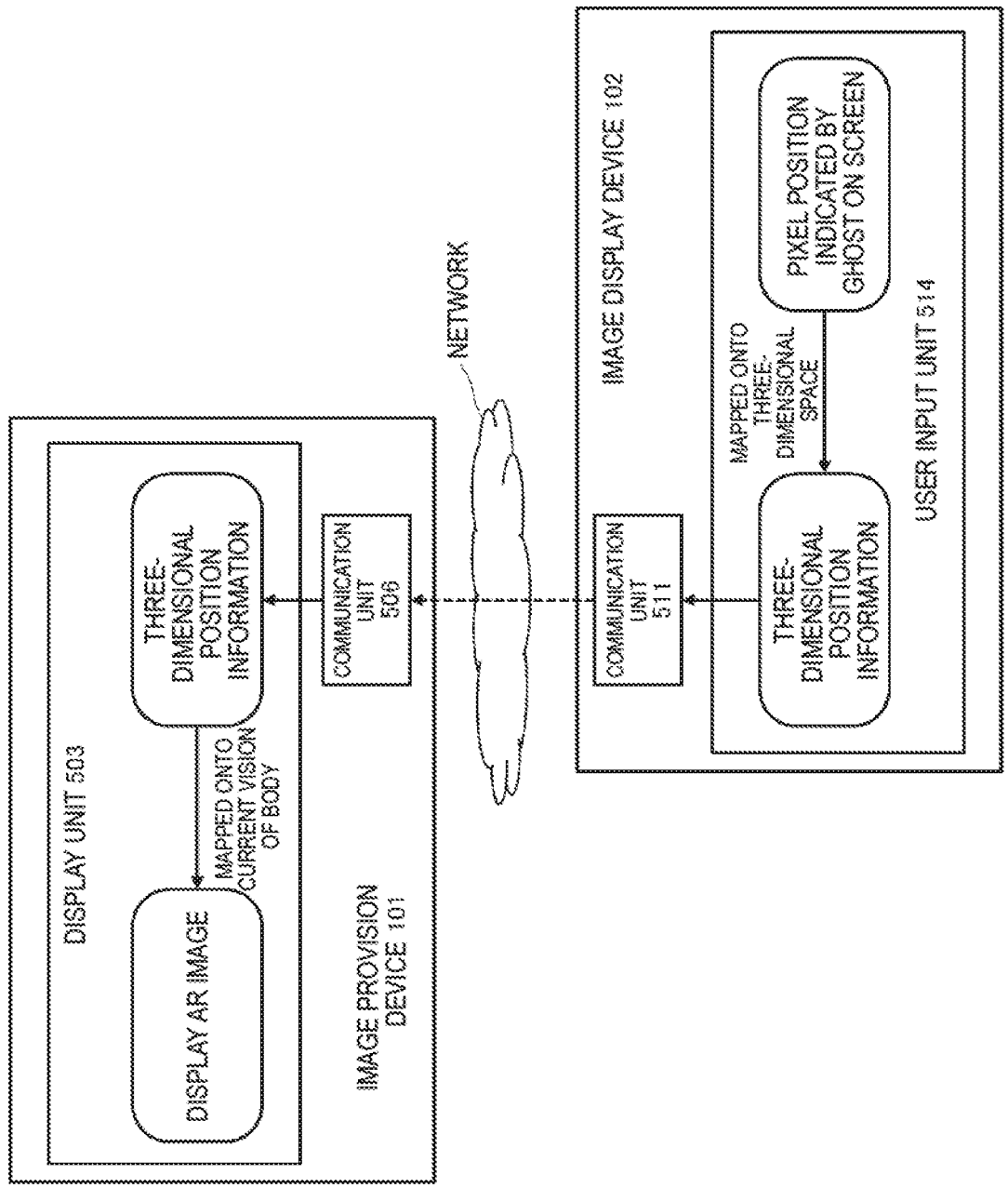
FIG. 7 describes a mechanism in which a Ghost visually intervenes in a Body.

FIG. 7 schematically illustrates a mechanism in which the Ghost visually intervenes in the Body. Instead of transmitting pixel coordinate information on a screen indicated by the Ghost via the user input unit 514, the image display device 102 specifies, by image analysis or the like, a location indicated by the Ghost in a three-dimensional space of a first person image of the Body and transmits the position information in the three-dimensional space to the image provision device 101. Then, in the image provision device 101, the display unit 503 maps the location indicated by the Ghost onto the same location in the vision of the Body on the basis of the received three-dimension position information and superimposes and displays an AR image (pointer) presenting the location on the vision of the Body. Further, the AR image such as a pointer is not mapped onto a pixel position on the display screen of the display unit 503 but is mapped onto an actual three-dimensional space. Therefore, even in a case where the Body shakes his/her head or moves to another location, the pointer remains superimposed and displayed on the same location in the three-dimensional space.

In a case where the image display device 102 performs head tracking (described above) of the Ghost, the vision of the Body and a display angle of view observed by the Ghost may not match. For example, a current field of view of the Body is an image in FIG. 8, whereas an image illustrated in FIG. 9 is displayed on a display unit 413 of the image display device 102 because the Ghost turns to the right, and therefore the image does not match with the vision of the Body. Even in such a case, a location indicated by the Ghost via the user input unit 514 is converted into position information in the three-dimensional space of the vision of the Body and is then transmitted. Therefore, the display unit 503 of the image provision device 101 can display an AR image at the same location in the three-dimensional space and thus correctly transmit the location indicated by the Ghost to the Body.

For example, the Ghost is assumed to indicate a single boat moored at a bank of a canal as denoted by a reference sign 901 in the display image illustrated in FIG. 9. When the user input unit 514 determines that the Ghost indicates the boat 901 on the screen, the user input unit 514 transmits position information indicating a location of the boat 901 in the three-dimensional space to the image provision device 101. In the image provision device 101, the display unit 503 maps the location indicated by the Ghost onto the vision of the Body on the basis of the received three-dimension position information and superimposes and displays an AR image such as a pointer denoted by a reference sign 801 on the boat indicated by the Ghost in the vision of the Body. Therefore, the Body can visually understand that a boat in the own vision is indicated by the Ghost, and therefore it is possible to achieve an interaction through visual intervention by the Ghost.

Figure 8:
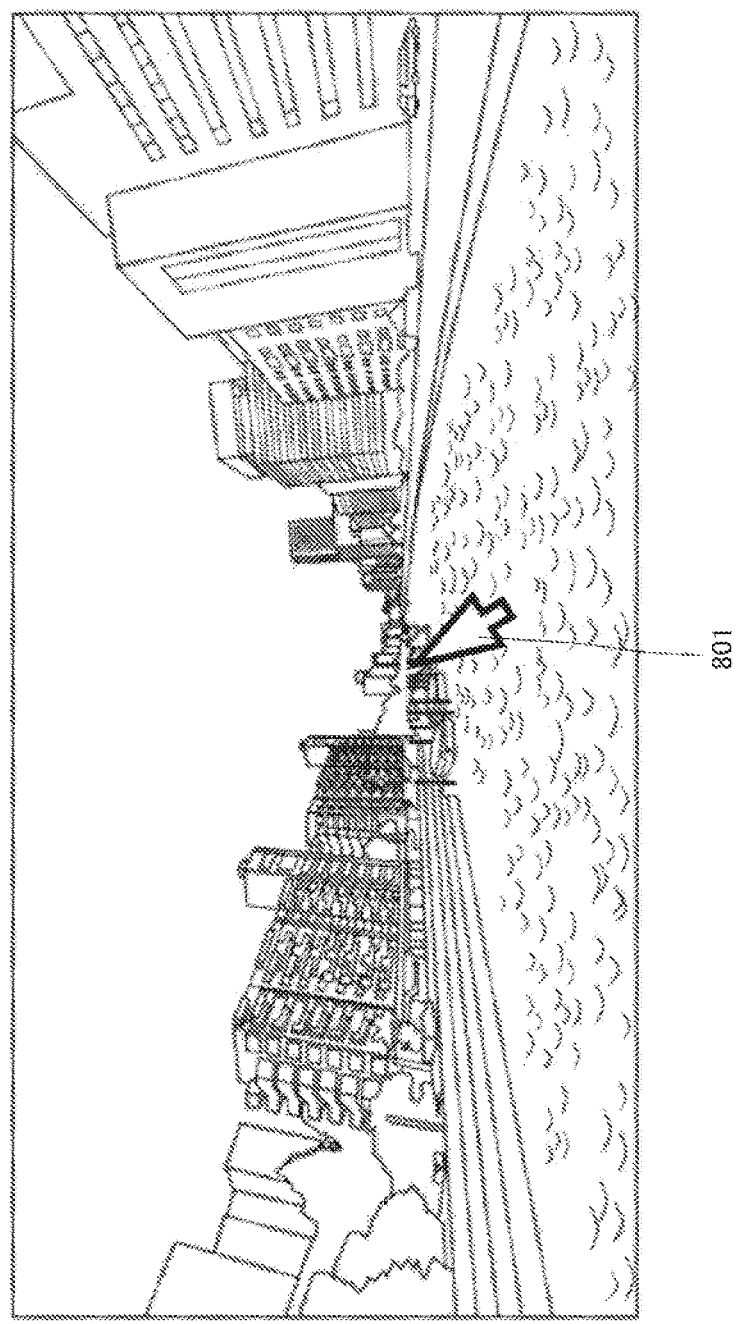
FIG. 8 exemplifies a state in which a Ghost intervenes in vision of a Body.
Figure 9:
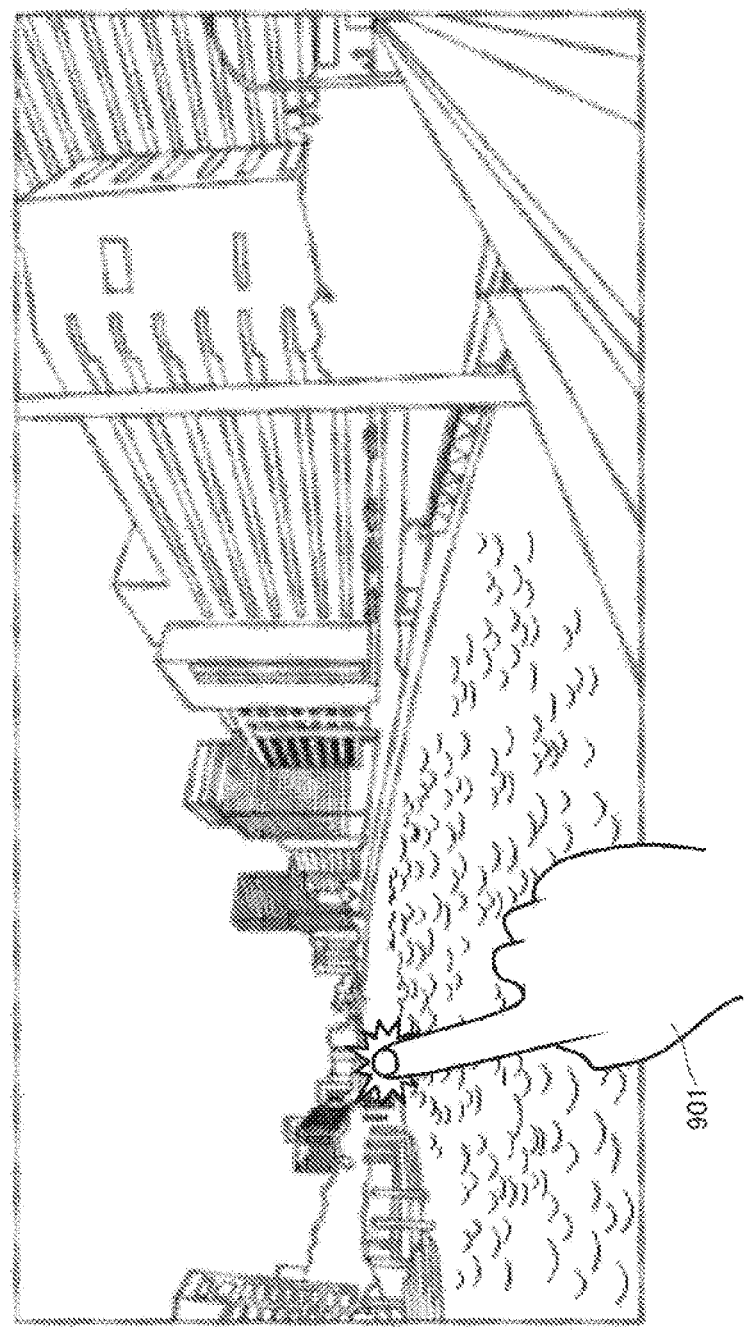
FIG. 9 exemplifies a state in which a Ghost intervenes in vision of a Body.

Further, the Ghost can intervene in the vision of the Body not only in the form of an indication of a location illustrated in FIG. 8 but also in the form of an instruction to move a field of view.

Figure 10:
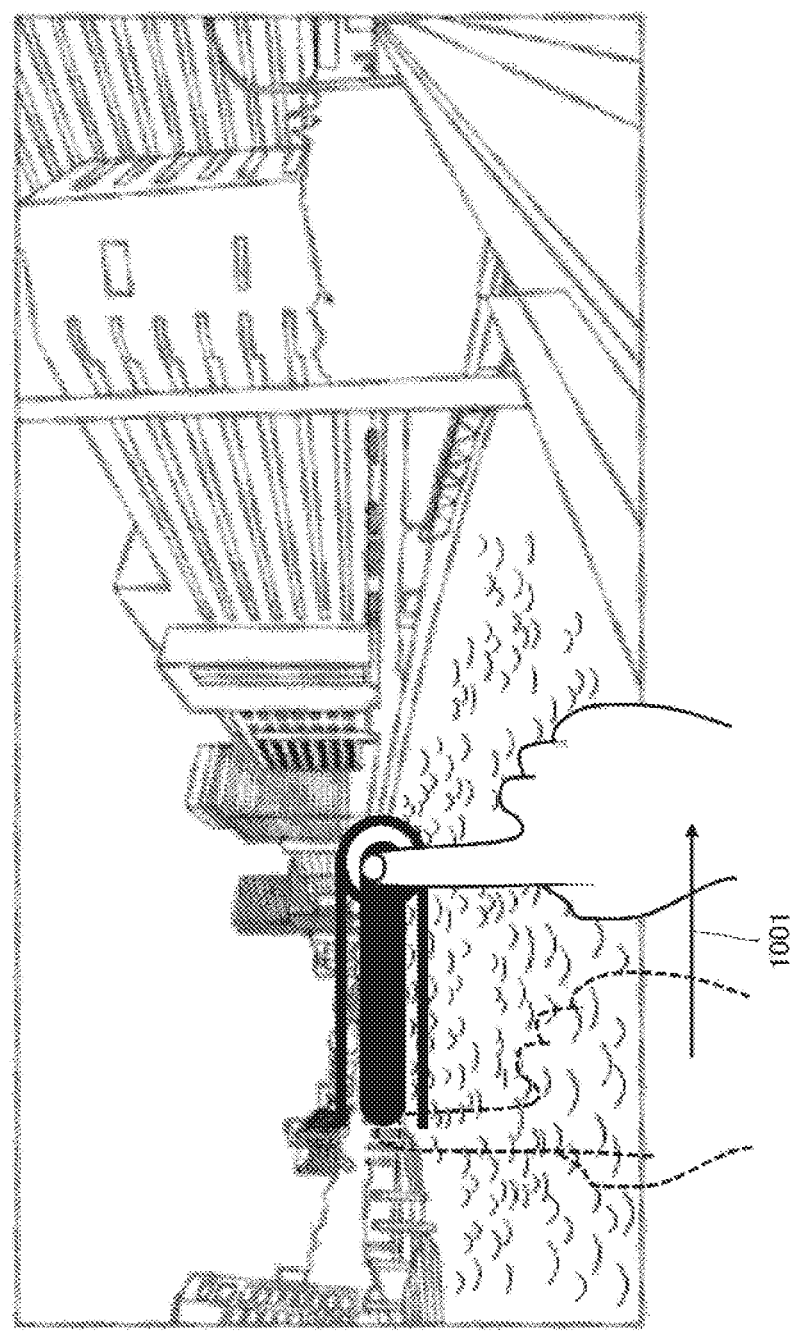
FIG. 10 describes a mechanism in which a Ghost visually intervenes in a Body.

FIG. 10 schematically illustrates a mechanism in which the Ghost instructs the Body to move the vision. In the image display device 102, the Ghost can input an instruction for the Body on a moving direction of the field of view by swipe operation on the touchscreen as denoted by a reference sign 1001. Drag operation can be performed by using a mouse or a direction can be input by using a joystick. Alternatively, the Ghost can input an instruction for the Body on the moving direction of the field of view also by inputting audio such as "Turn to the left a bit more".

Further, in order to use audio input in the image display device 102, the user input unit 514 only needs to recognize audio of the Ghost and convert the audio into an instruction for the Body on the moving direction of the field of view. In response to such an instruction in the image display device 102, the image provision device 101 superimposes and displays an AR image showing the moving direction of the vision, such as an arrow denoted by a reference sign 1101, on the vision of the Body (see FIG. 11) and can therefore instruct the Body to turn to the left a bit more (or move toward the left).

Figure 11:
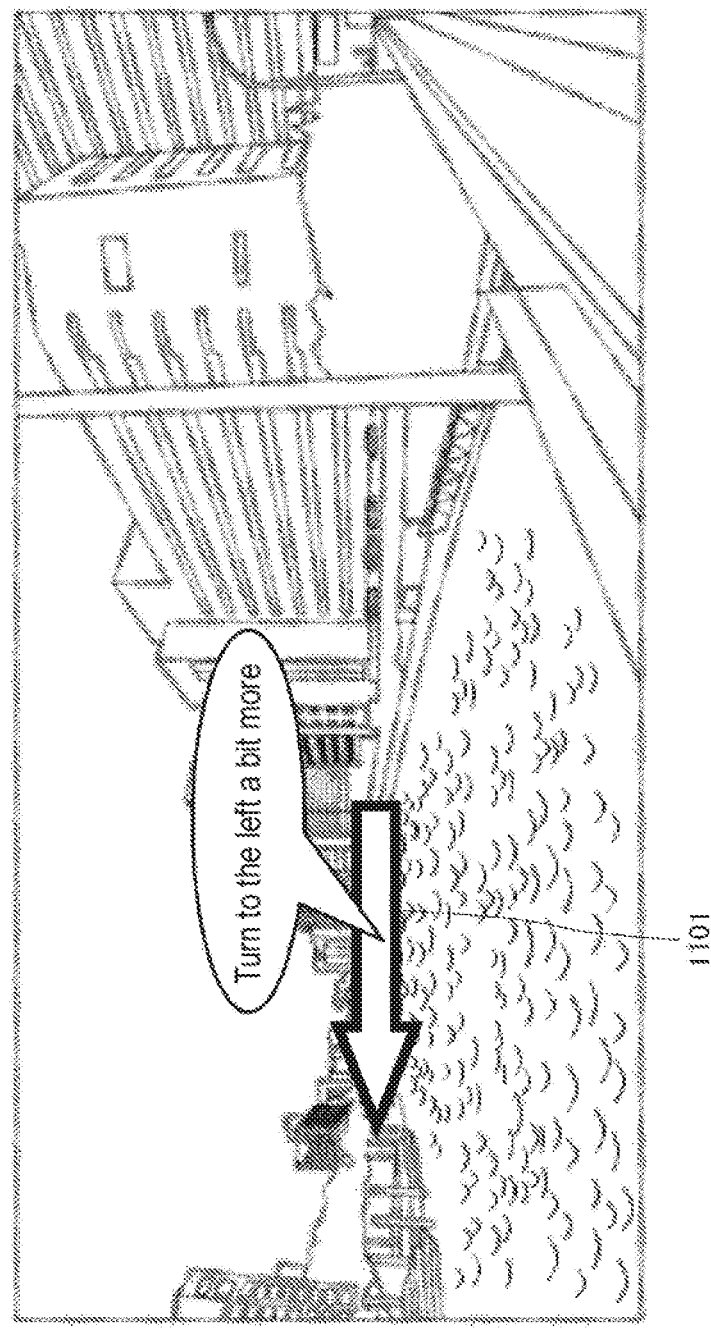
FIG. 11 exemplifies a state in which a Ghost intervenes in vision of a Body (display of a moving direction of vision).
Figure 12:
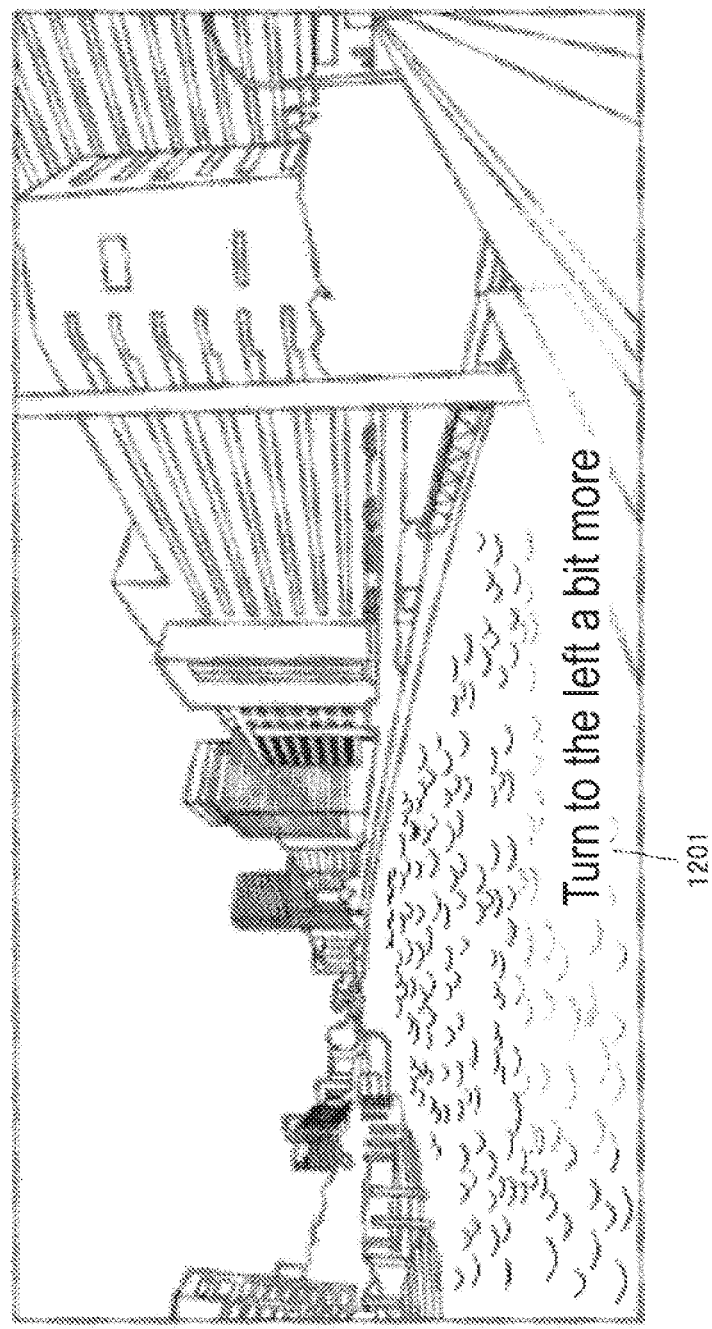
FIG. 12 exemplifies a state in which a Ghost intervenes in vision of a Body (display of text information).
Figure 13:
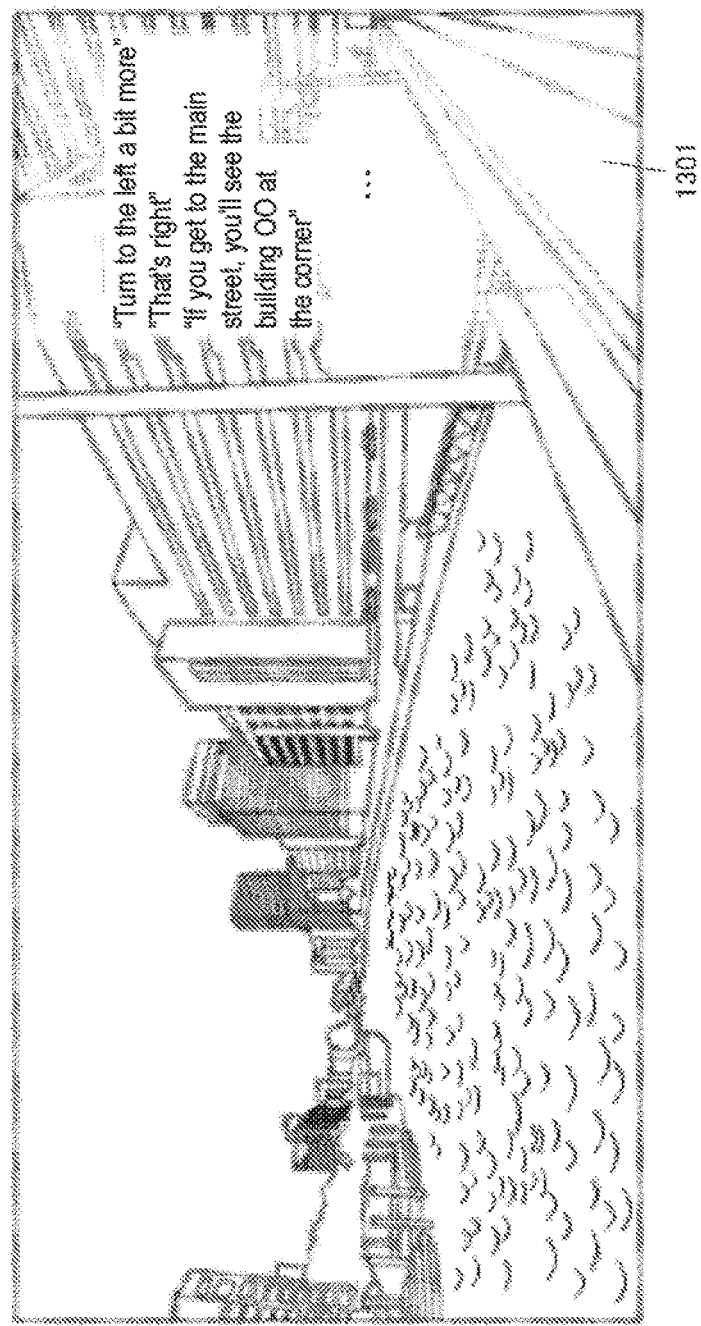
FIG. 13 exemplifies a state in which a Ghost intervenes in vision of a Body (in the form of a chat).

Further, the display unit 503 may perform display so that an AR image including a figure illustrated in FIG. 7 or FIG. 11 is superimposed on the vision of the Body and, in addition, may display text information showing an instruction from the Ghost. FIG. 12 illustrates a state in which text information "Turn to the left a bit more" given by the Ghost as an instruction is displayed as denoted by a reference sign 1201. Alternatively, as illustrated in FIG. 13, text information given by the Ghost as an instruction may be displayed by using a region 1301 on the periphery of the vision of the Body in a display form such as a chat or a bulletin board system.

Which location in the vision of the Body the display unit 503 arranges text information is arbitrarily determined. Note that, in order not to interrupt operation performed by the observer 111, it is preferable to display text information on the periphery of the vision of the Body as illustrated in FIG. 12 so as not to block the vision as much as possible. Alternatively, in order that the Body does not miss an urgent instruction from the Ghost, the display unit 503 may purposely display large text information at the center of the vision of the Body (i.e., to make the text information conspicuous).

Further, in a case where instructions containing text information are continuously transmitted from the Ghost, the display unit 503 may switch and display the text information in the received order or may perform scroll-display of the text information in a vertical or horizontal direction.

Figure 14:
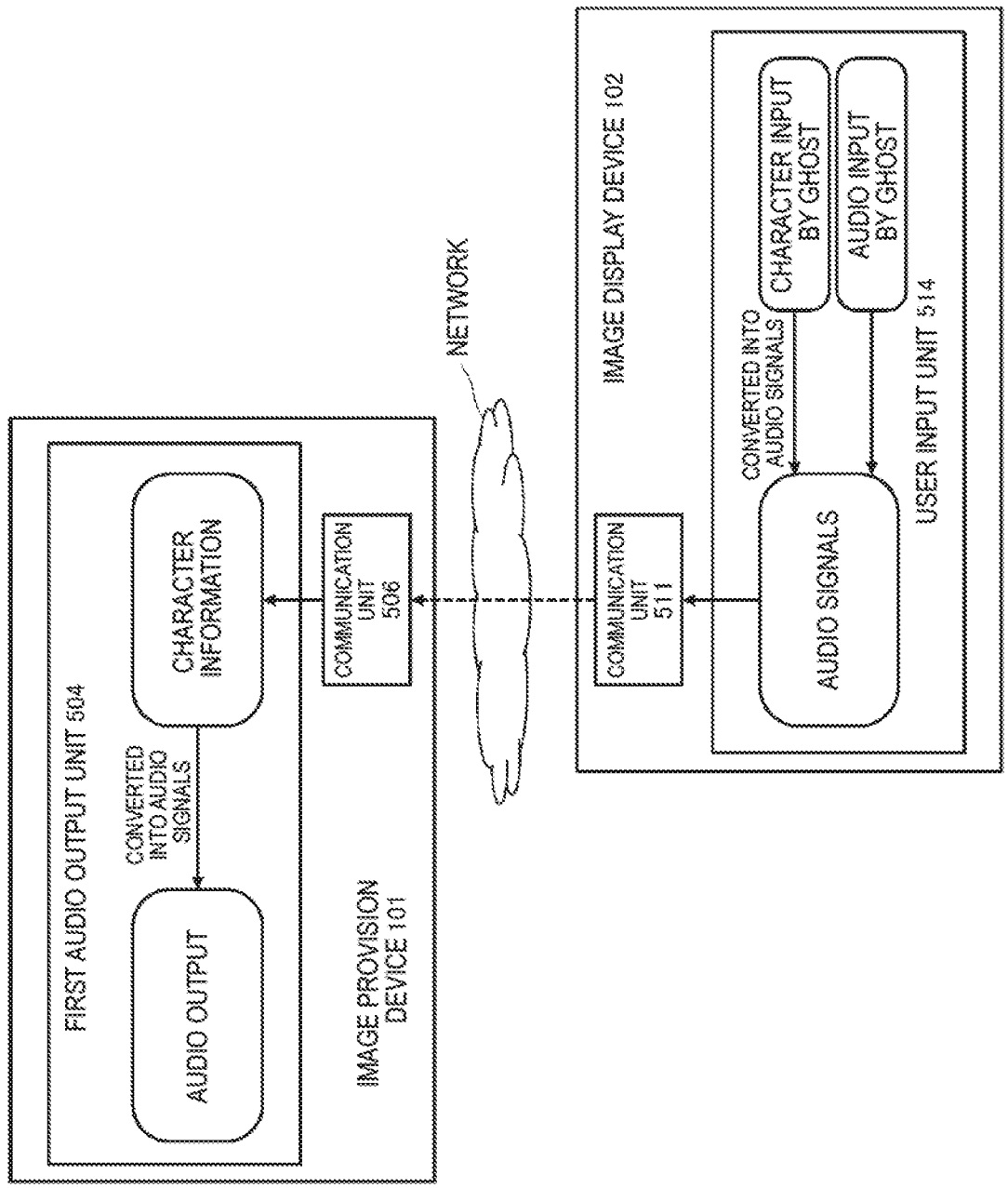
FIG. 14 describes a mechanism in which a Ghost auditorily intervenes in a Body.

Further, in a case where an instruction of the Ghost is received as text information from the image display device 102, the image provision device 101 may convert the text information into audio signals and output audio from the first audio output unit 504, thereby transmitting the audio to the Body as an audio message (see FIG. 14), instead of displaying the text information on the display unit 503 as described above. By outputting the text information not visually but auditorily, the instruction from the Ghost can be transmitted without blocking the vision of the Body. In a case where blocking even part of the vision of the observer 111 serving as the Body hinders operation on a site or a case where the Body can continue operation without listening to audio on a site (such as a case where the Body perform operation by himself/herself), text information is converted into audio signals and is output in the form of audio. This makes it possible to effectively give an instruction to the Body.

D. Simultaneous Intervention in Body by a Plurality of Ghosts

As described above, the Ghost can give an instruction on behavior on a site to the Body by performing "visual intervention", "auditory intervention", or "body intervention" with the use of a communication function between the image display device 102 and the image provision device 101.

In a case where the Body and the Ghost have one-to-one relationship, the Body can clearly understand from whose instruction "visual intervention", "auditory intervention", or "body intervention" is performed.

Meanwhile, in a network topology of 1 to N (or N to N) in which a plurality (N) of Ghosts perform JackIn to a single Body as illustrated in FIG. 2, it is also assumed that the plurality of Ghosts simultaneously intervene in the vision, the auditory sensation, and the body of the Body. For example, the following "interferences" are problematic: a plurality of Ghosts visually intervene in a single Body and therefore the vision of the Body (AR display) is complicated; auditory interventions by a plurality of Ghosts are mixed and therefore instructions from the respective Ghosts cannot be heard; and a plurality of Ghosts simultaneously intervene in the body and therefore the Body cannot move.

Figure 15:
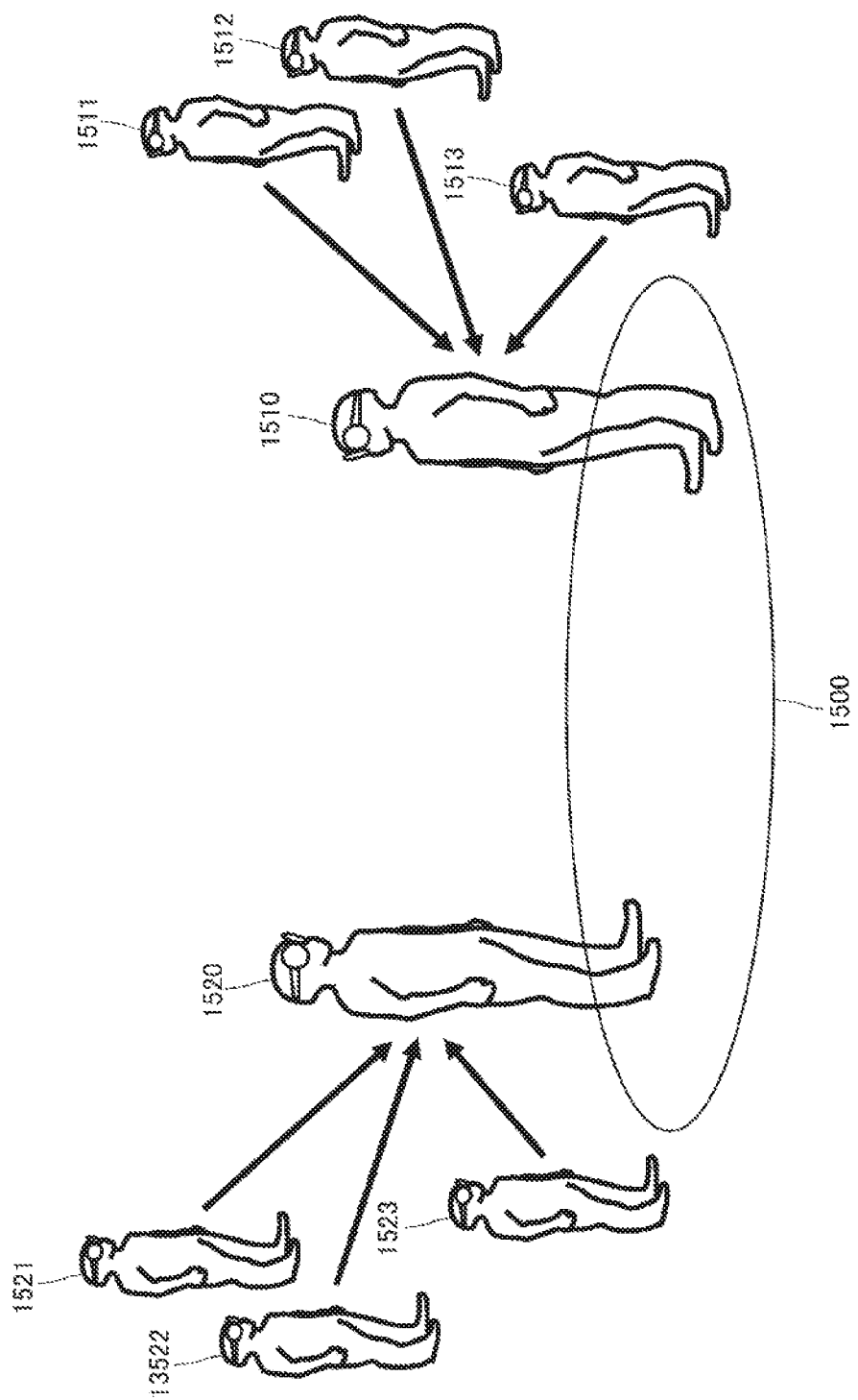
FIG. 15 exemplifies a space 1500 in which a plurality of Ghosts simultaneously intervene in a Body.

For example, as illustrated in FIG. 15, a use case of JackIn in the form of 1 to N is such that, in a case where two Bodies 1510 and 1520 play a match such as a game in a space denoted by a reference sign 1500, a plurality of Ghosts 1511, 1512, and 1513 who overlook the space 1300 transmit instructions to (i.e., intervene in) the one Body 1511, and, similarly, a plurality of Ghosts 1521, 1522, and 1523 on the back side transmit instructions to (i.e., intervene in) the other Body 1520.

In such a case, a group of the Ghosts 1511, 1512, and 1513 (or a group of the Ghosts 1521, 1522, and 1523) can transmit, to the Body 1510 (or the Body 1520), an accurate and excellent instruction that is not conceivable by each person, as the proverb "Two heads are better than one." describes. On the contrary, in a case where too many people instruct the Body 1510 (or the Body 1520), the people lacks coordination and thus cannot play the game properly, which may fall into a situation that is rather described by the proverb "Too many cooks spoil the broth".

In view of this, in the present embodiment, in a case where a plurality of Ghosts simultaneously intervene (i.e., in a case where pieces of information from a plurality of image display devices 102 are simultaneously received), the output unit (the display unit 503, the first audio output unit 504, the drive unit 505, and the second audio output unit) of the image provision device 101 integrates the plurality of pieces of information and then outputs the information, instead of simply outputting the pieces of information transmitted from all the Ghosts. Thus, interference prevention processing is performed on the Body side.

For example, in a case where a first Ghost and a second Ghost receive an image (first person view) captured by the Body and first information generated in accordance with input to the first Ghost and second information generated in accordance with input to the second Ghost are transmitted to the Body, the control unit 509 performs control so that an integrated image obtained by integrating the first information and the second information is displayed and output to the display unit 503.

Figure 16:
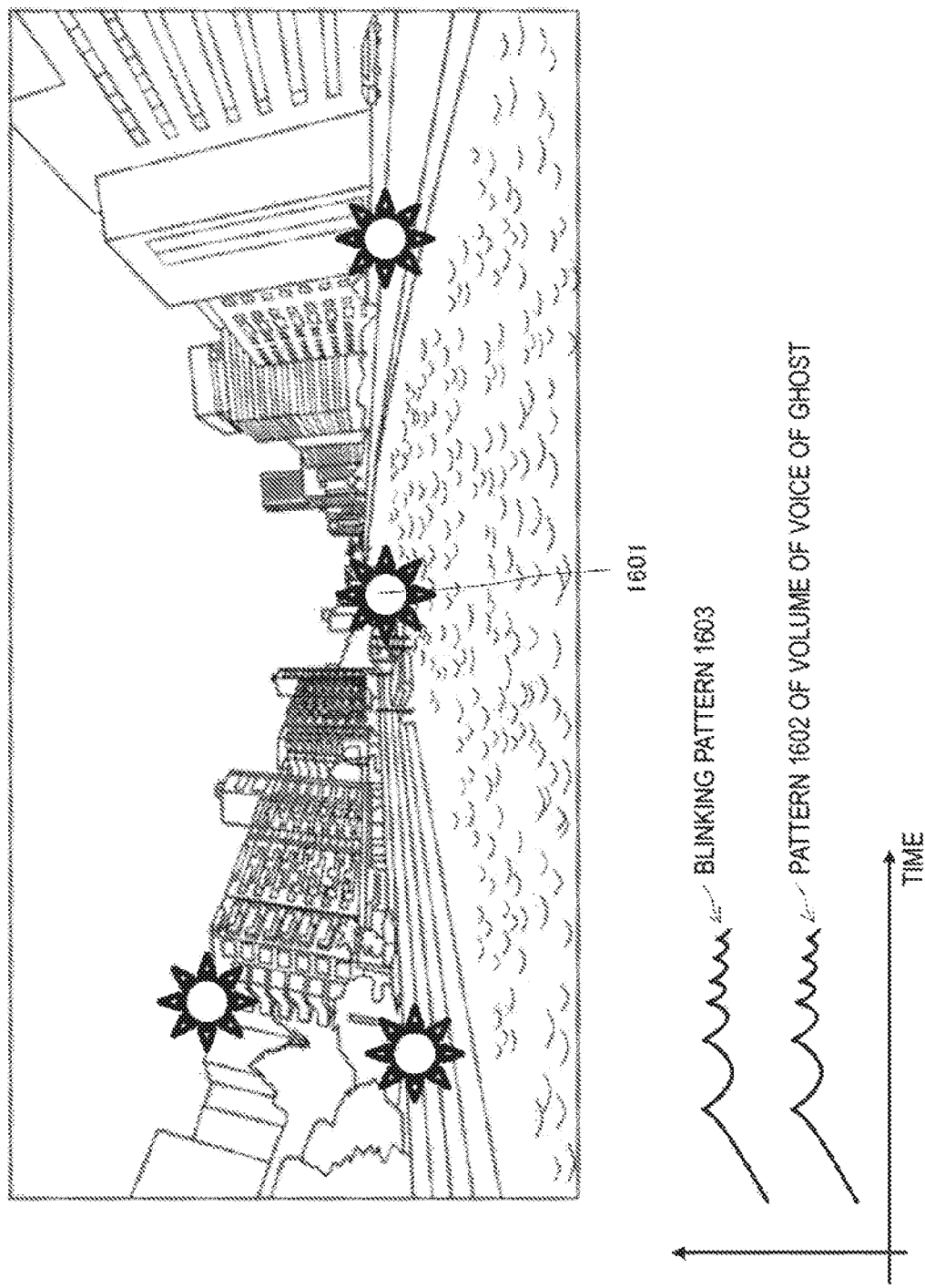
FIG. 16 exemplifies visual intervention in which the same blinking pattern as a pattern of volume of a voice of a Ghost is applied to a pointer.

A specific example will be described with reference to FIG. 16. In a case where a plurality of Ghosts perform visual intervention, i.e., indicate locations in the field of view of the Body while uttering their respective voices, it is difficult for the Body to match the voices of the respective Ghosts with pointers only by simply performing AR display of the pointers on the locations indicated by the respective Ghosts. In view of this, as illustrated in FIG. 16, a visual intervention unit 403 applies, to a pointer 1601, a blinking pattern 1603 that synchronously blinks with the same waveform as that of a pattern 1602 of volume of a voice of the corresponding Ghost. With this, the Body searches for the pointer 1601 that blinks in synchronization with a change in the volume of the voice in the own vision and thus can easily match the voice of the Ghost with the pointer.

Figure 17:
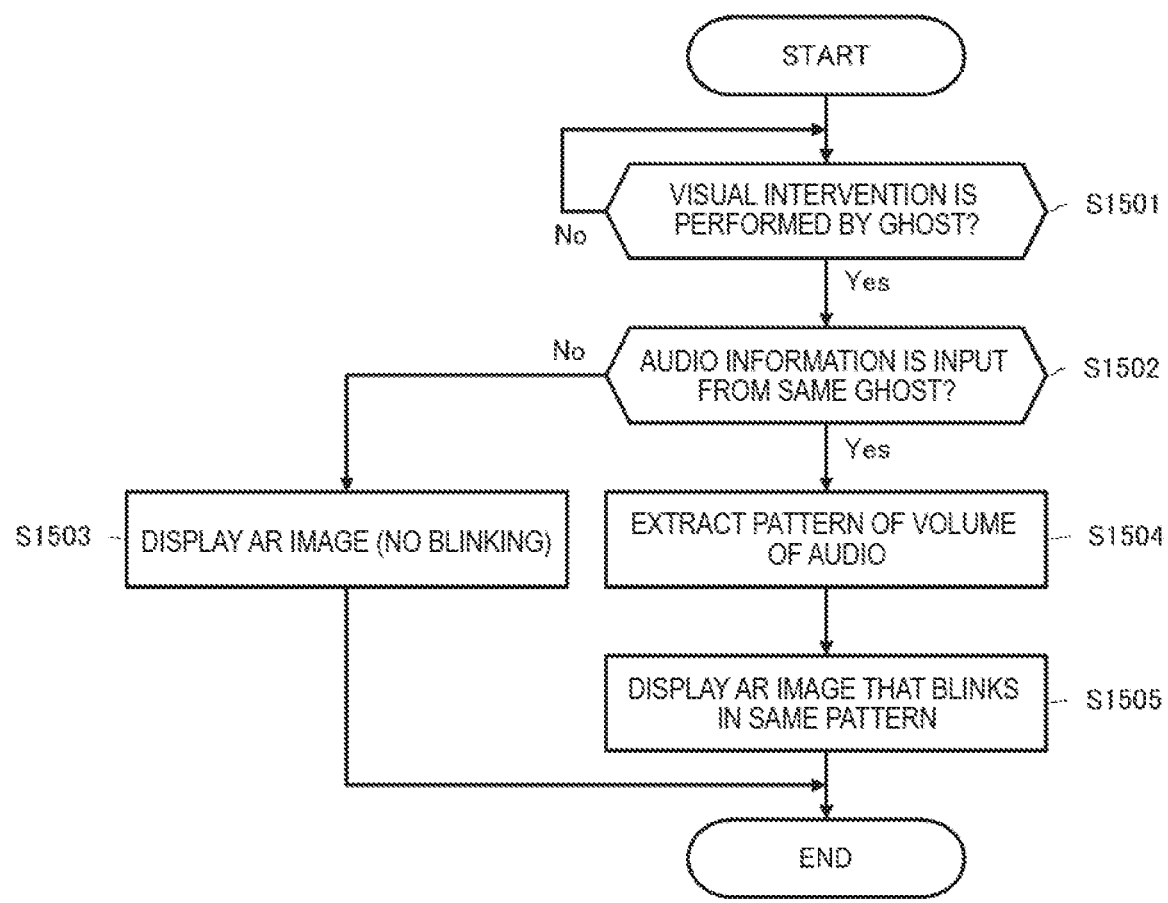
FIG. 17 is a flowchart showing an example of a procedure in the image provision device 101 for processing visual intervention by a Ghost.

FIG. 17 is a flowchart showing an example of a procedure in the image provision device 101 for processing visual intervention by the Ghost.

When a communication unit 406 receives an instruction to intervene in vision of the Body (e.g., information of a location indicated by the Ghost) from the image display device 102 (Yes in Step S1501), whether or not audio information of the Ghost has also been received from the same image display device 102 is further checked (Step S1502).

Herein, in a case where audio information of the Ghost is not received from the same image display device 102 (No in Step S1502), the display unit 503 superimposes and displays an AR image of a pointer showing the location indicated by the Ghost on the vision of the Body as it is (without blinking) (Step S1503) and thus terminates this processing routine.

On the contrary, in a case where audio information of the Ghost is received from the same image display device 102 (Yes in Step S1502), the display unit 503 analyzes the audio information to extract a pattern of volume of audio (Step S1504), superimposes and displays an AR image of a pointer having the same blinking pattern as the pattern of the volume of the voice on the vision of the Body (Step S1505), and thus terminates this processing routine.

Figure 18:
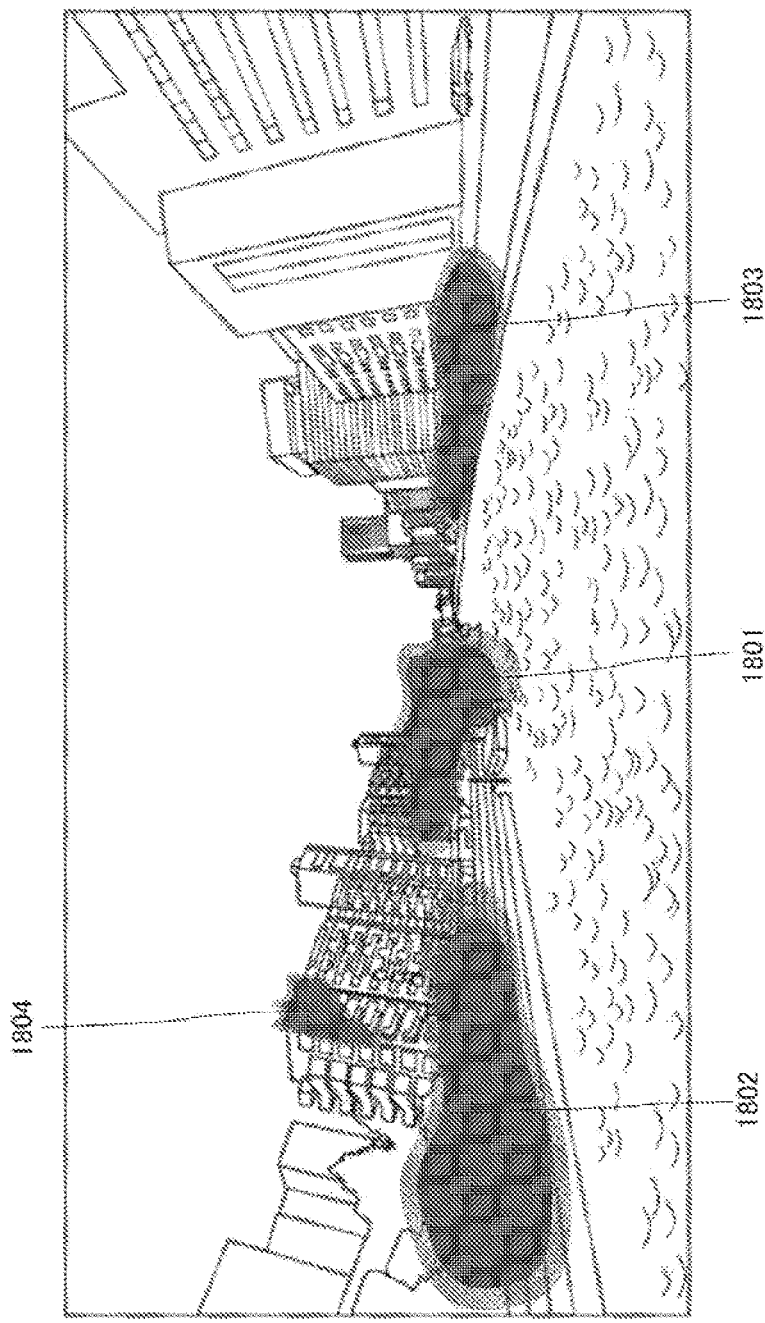
FIG. 18 illustrates an example of displaying a heat map showing locations indicated by Ghosts.

Further, when a great number of Ghosts simultaneously visually intervene in a single Body and pointers are displayed at locations indicated by the respective Ghosts, the vision of the Body is blocked by the pointers, and therefore which locations are actually indicated is unclear. Further, the vision of the Body is covered by AR images of the pointers, and therefore the Body cannot move on a site. In view of this, the display unit 503 may totalize the locations indicated by the large number of Ghosts who simultaneously visually intervene therein and display a distribution of the indicated locations in the form of a heat map as denoted by reference signs 1801 to 1804 in FIG. 18. With this, no matter how many Ghosts simultaneously visually intervene therein, it is possible to prevent the vision of the Body from being unlimitedly blocked, and the Body can visually recognize a location indicated by more Ghosts with ease on the basis of display of the heat map.

The heat map can also be referred to as aggregate pointer display. Note that the heat map is not mapped onto a pixel position on the display screen of the display unit 503 but is mapped onto an actual three-dimensional space. Therefore, even in a case where the Body shakes his/her head or moves to another location, the heat map remains superimposed and displayed on the same location in the three-dimensional space.

Figure 19:
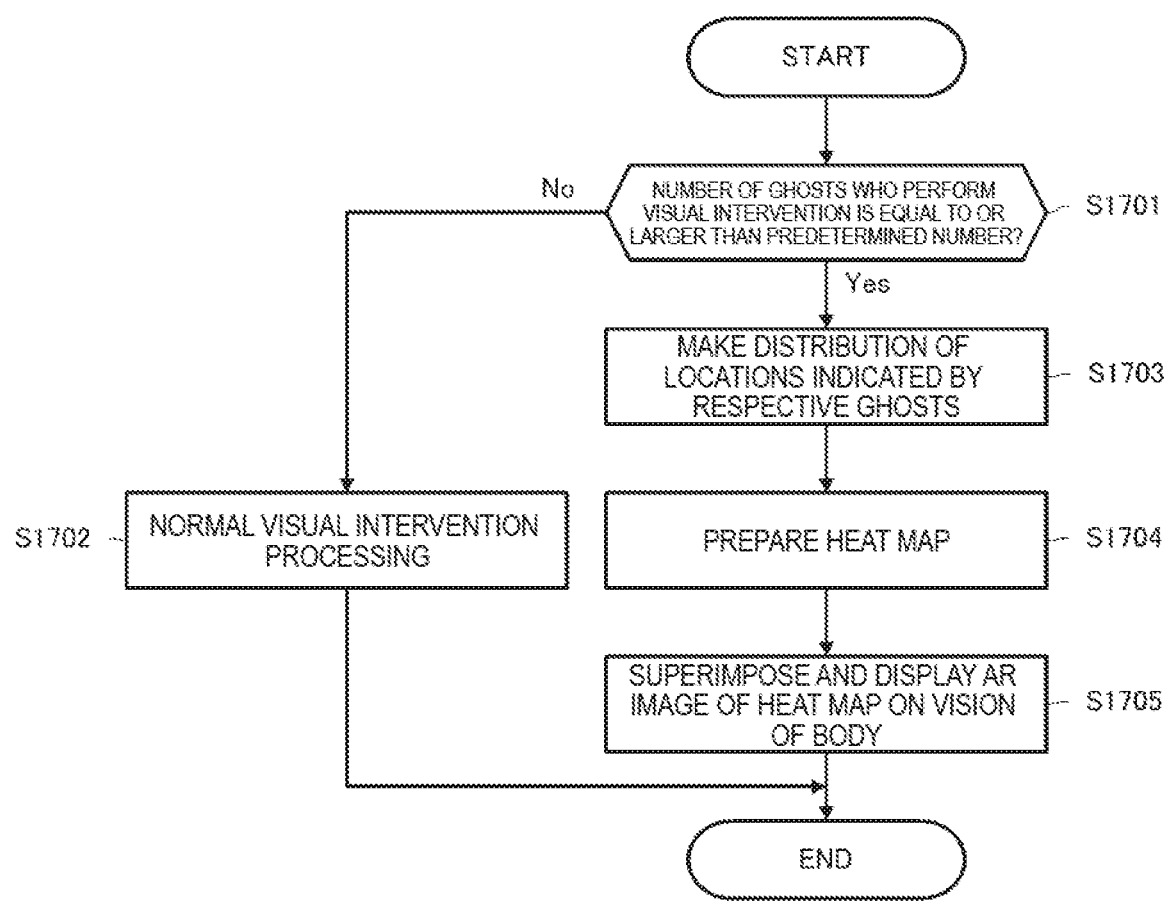
FIG. 19 is a flowchart showing a processing procedure in the image provision device 101 for displaying visual intervention by a large number of Ghosts in the form of a heat map.

FIG. 19 is a flowchart showing a processing procedure in the image provision device 101 for displaying visual intervention by a large number of Ghosts in the form of a heat map.

First, whether or not the number of Ghosts who intervene in the vision of the Body (i.e., the number of image display devices 102 that transmit information of a location indicated by the Ghost) exceeds a predetermined number is checked (Step S1701).

Herein, when the number of Ghosts who intervene in the vision is smaller than the predetermined number (No in Step S1701), the display unit 503 executes normal visual intervention processing (Step S1702) and terminates this processing routine. The normal visual intervention processing is implemented in accordance with, for example, the processing procedure illustrated in FIG. 17 and a pointer is superimposed and displayed on the location indicated by the Ghost.

On the contrary, when the number of Ghosts who intervene in the vision exceeds the predetermined number (Yes in Step S1701), the display unit 503 displays a heat map showing locations indicated by the large number of Ghosts who simultaneously visually intervene therein. Specifically, a distribution of the locations indicated by the respective Ghosts is made in a three-dimensional space of the vision of the Body (Step S1703), and the distribution is plotted in accordance with a color scale or gradation scale to prepare a heat map (Step S1704). Then, the prepared heat map is superimposed and displayed on the vision of the Body (Step S1705).

Further, as illustrated in FIG. 13, there is also a form of visual intervention in which text information input as text via a keyboard or the like in the image display device 102 or text information obtained by recognizing audio of the Ghost is displayed on the vision of the Body in a display form such as a chat. However, in a case where pieces of text information are simultaneously transmitted from a large number of Ghosts and those pieces of text information are simply arranged in, for example, time series and are displayed on the vision of the Body, the Body cannot determine what to do. This is problematic. As a simple example, when pieces of text information instructing the Body to perform opposite behaviors, such as "Turn to the left a bit more" and "Turn to the right a bit more", are simultaneously displayed, the Body cannot determine which instruction to follow and may therefore be confused. Further, the vision of the Body is filled with a large number of pieces of text information. This is also problematic.

In view of this, instead of displaying all the pieces of text information transmitted from the large number of Ghosts, the display unit 503 preferably performs processing for reducing an amount of text information (or the number of characters) displayed on the vision of the Body.

For example, the display unit 503 may extract only a common word, a word that frequently appears, and a word serving as a keyword from the text information transmitted from the large number of Ghosts and perform processing for reducing the text information. At the time of extracting words, synonyms may be integrated into a single word. Then, the display unit 503 may change a font size, color, gradation, or the like of a plurality of extracted keywords in accordance with a frequency of appearance, importance, or the like and superimpose and display the plurality of keywords on the vision of the Body as if the plurality of keywords floated like a cloud in the form of a tag cloud (e.g., see Patent Literature 5).

Alternatively, the display unit 503 may apply processing such as language analysis or language recognition to a large number of pieces of transmitted text information and display only summarized text information on the vision of the Body.

Figure 20:
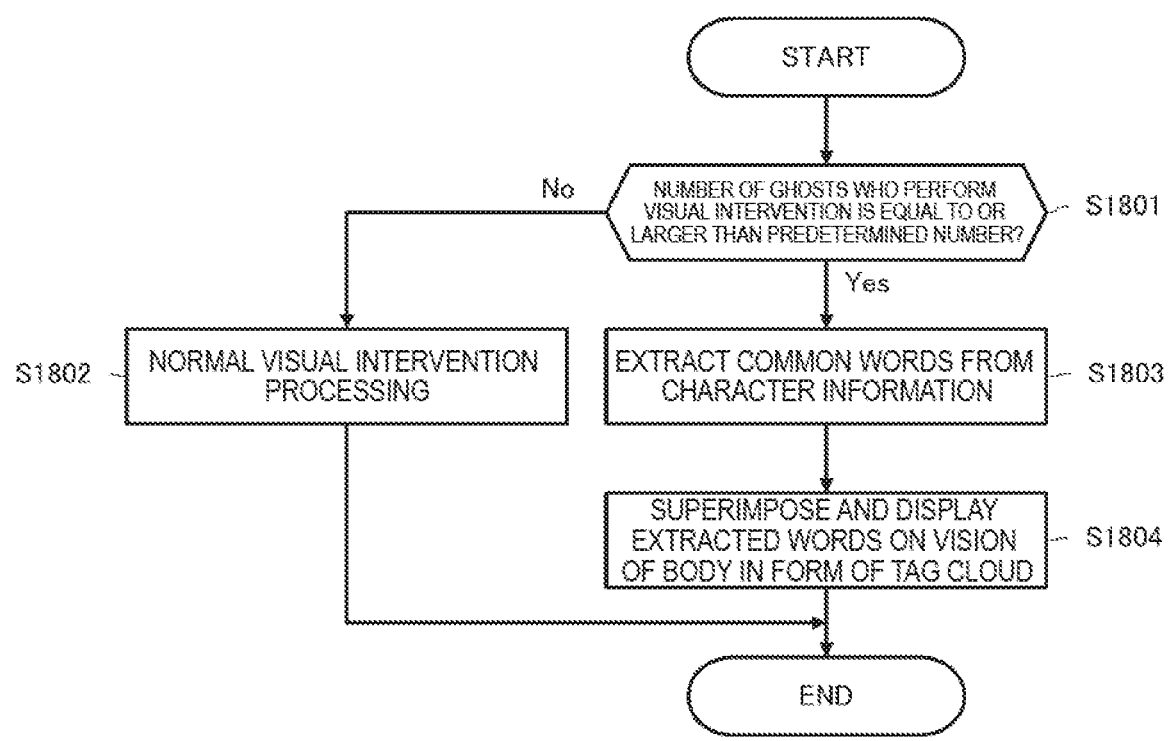
FIG. 20 is a flowchart showing a processing procedure in the image provision device 101 for displaying text information transmitted from Ghosts.

FIG. 20 is a flowchart showing a processing procedure in the image provision device 101 for displaying text information transmitted from Ghosts.

First, whether or not the number of pieces of text information transmitted from Ghosts (i.e., the number of image display devices 102 that transmit text information) exceeds a predetermined number is checked (Step S1801).

Herein, the number of pieces of text information is smaller than the predetermined number (No in Step S1801), the display unit 503 executes normal visual intervention processing (Step S1802) and terminates this processing routine. In the normal visual intervention processing, the text information is displayed as it is as illustrated in, for example, FIG. 12. Alternatively, as illustrated in FIG. 13, the text information may be displayed by using a region on the periphery of the vision of the Body in the form of a chat, a bulletin board system, or the like.

On the contrary, when the number of pieces of text information exceeds the predetermined number (Yes in Step S1801), the display unit 503 implements processing for reducing an amount of the text information (or the number of characters) to be displayed on the vision of the Body. The display unit 503 extracts, for example, common words from the large number of pieces of transmitted text information (Step S1803) and superimposes and displays the common words on the vision of the Body in the form of a tag cloud (Step S1804). Alternatively, the display unit 503 applies processing such as language analysis or language recognition to the large number of pieces of text information and displays only summarized text information on the vision of the Body. Such reduction processing prevents the Body from being confused.

Note that the above processing for integrating instruction information transmitted to a certain Body from a plurality of Ghosts may be implemented in the server interposed between the Body and the Ghost, instead of the image display device 102 (e.g., head mounted display worn by the Body), and a result of the processing performed by the server may be provided to the Body.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

The technology disclosed in the present specification can be utilized for, for example, operation support and the like in various industrial fields such as a medical site of a surgical operation and the like, a construction site of a construction work and the like, control of airplanes and helicopters, navigation of drivers of automobiles, instructions in sports, and other uses.

Further, in the present specification, an embodiment of a system in which a Ghost who shares a first person image of a Body who acts on a site with his/her body intervenes in vision, an auditory sensation, or the like of the Body has been mainly described. However, the scope of the technology disclosed in the present specification is not limited thereto. It is also possible to apply the technology disclosed in the present specification to various information processing devices for displaying, on vision of a certain person, information regarding assistance, instruction, guidance, and navigation from another person.

Essentially, the technology disclosed in this specification has been described by way of example, and the stated content of this specification should not be interpreted as being limiting. The spirit of the technology disclosed in this specification should be determined in consideration of the claims.

Additionally, the technology disclosed in the present specification can also be configured as below.

(1)

An information processing system including:

a control unit configured to control display of an integrated image obtained by integrating first information generated in accordance with input to a first system that receives a captured image by an imaging system and second information generated in accordance with input to a second system that receives the captured image by the imaging system.

(2)

The information processing system according to (1), in which the control unit controls display of the integrated image obtained by integrating the first information based on audio information input to the first system and the second information based on audio information input to the second system.

(3)

The information processing system according to (1), in which the control unit controls display of the integrated image on a basis of audio information input to the first system.

(4)

The information processing system according to (3), in which the control unit causes the first information contained in the integrated image to change in accordance with a change in stress of audio input to the first system.

(5)

The information processing system according to (1), in which the control unit controls display of the integrated image showing a distribution of locations indicated by a plurality of systems that include the first system and the second system and receive the captured image.

(6)

The information processing system according to (1), in which the control unit controls display of the integrated image obtained by integrating the first information and the second information including text information.

(7)

The information processing system according to (1), in which the control unit extracts a common word or a word that frequently appears from a plurality of pieces of text information generated by a plurality of systems that include the first system and the second system and receive the captured image and causes the word to be displayed.

(8)

The information processing system according to (7), in which the control unit causes the extracted words to be displayed in a form of a tag cloud.

(9)

The information processing system according to (1), in which the control unit summarizes a plurality of pieces of text information generated by a plurality of systems that include the first system and the second system and receive the captured image and causes the summarized text information to be displayed.

(10)

The information processing system according to (1), further including:

an imaging unit configured to generate the captured image.

(11) The information processing system according to (1), further including:

a display unit, in which the control unit controls display of the integrated image by the display unit.

(12)

The information processing system according to (11), in which the display unit performs display by superimposing the integrated information on a scene of a real world.

(13)

An information processing method including:

a step of controlling display of an integrated image obtained by integrating first information generated in accordance with input to a first system that receives a captured image by an imaging system and second information generated in accordance with input to a second system that receives the captured image by the imaging system.

REFERENCE SIGNS LIST 100 visual information sharing system
101 image provision device
102 image display device
501 imaging unit
502 image processing unit
503 display unit
504 first audio output unit
505 drive unit
506 second audio output unit
507 position detection unit
508 communication unit
509 control unit
510 authentication unit
511 communication unit
512 image decoding unit
513 display unit
514 user input unit
515 position posture detection unit

The invention claimed is:

1. An information processing system comprising:
at least one processor configured to:
send an image captured by a camera of a mobile terminal to a first system and a second system;
integrate first text information generated by the first system and second text information generated by the second system by extracting at least one of a common word or a frequently-appearing word from the first text information and the second text information, wherein the first text information and the second text information are related to the captured image; and
control a display device of the mobile terminal to display the at least one of the extracted common word or the extracted frequently-appearing word.

2. The information processing system according to claim 1, wherein
the first text information is based on audio information received by the first system, and
the second text information is based on audio information received by the second system.

3. The information processing system according to claim 1, wherein
the at least one processor is configured to control the display device to change the at least one of the extracted common word or the extracted frequently-appearing word in accordance a change of a volume of audio information received by at least one of the first system or the second system.

4. The information processing system according to claim 1, wherein
the at least one processor is configured to control the display device to display a heat map image showing a distribution of locations indicated by a plurality of systems that include the first system and the second system.

5. The information processing system according to claim 1, wherein
the at least one processor is configured to control the display device to display the at least one of the extracted common words or the extracted frequently-appearing word in a form of a tag cloud.

6. The information processing system according to claim 1, wherein
the information processing system is the mobile terminal.

7. The information processing system according to claim 6, wherein
the mobile terminal is a head mounted display, and
the at least one processor is configured to control the head mounted display to superimpose the at least one of the extracted common word or the extracted frequently-appearing word on a scene of a real world.

8. The information processing system according to claim 1, wherein
the information processing system is a server that wirelessly connects to the first system and the second system.

9. An information processing method comprising:
sending, via an information processing server, an image captured by a camera of a mobile terminal to a first system and a second system;
integrating first text information generated by the first system and second text information generated by the second system by extracting at least one of a common word or a frequently-appearing word from the first text information and the second text information, wherein the first text information and the second text information are related to the captured image; and controlling a display device of the mobile terminal to display the at least one of the extracted common word or the extracted frequently-appearing word.

10. An information processing system comprising:
at least one processor configured to:
send an image captured by a camera of a mobile terminal to a first system and a second system;
integrate first text information generated by the first system and second text information generated by the second system by summarizing the first text information and the second text information, wherein the first text information and the second text information are related to the captured image; and
control a display device of the mobile terminal to display the summarized text information.

11. The information processing system according to claim 10, wherein
the first text information is based on audio information received by the first system, and
the second text information is based on audio information received by the second system.

12. The information processing system according to claim 11, wherein
the at least one processor is configured to control the display device to change the summarized text information in accordance a change of a volume of audio information received by at least one of the first system or the second system.

13. The information processing system according to claim 11, wherein
the at least one processor is configured to control the display device to display a heat map image showing a distribution of locations indicated by a plurality of systems that include the first system and the second system.

14. The information processing system according to claim 11, wherein
the at least one processor is configured to control the display device to display the summarized text information in a form of a tag cloud.

15. The information processing system according to claim 11, wherein
the information processing system is the mobile terminal.

16. The information processing system according to claim 15, wherein
the mobile terminal is a head mounted display, and
the at least one processor is configured to control the head mounted display to superimpose the summarized text information on a scene of a real world.

17. The information processing system according to claim 10, wherein
the information processing system is a server that wirelessly connects to the first system and the second system.

18. An information processing method comprising:
sending, via an information processing server, an image captured by a camera of a mobile terminal to a first system and a second system;
integrating first text information generated by the first system and second text information generated by the second system by summarizing the first text information and
the second text information, wherein the first text information and the second text information are related to the captured image; and
controlling a display device of the mobile terminal to display the summarized text information.

* * * * *